US009122977B2

(12) United States Patent
Kiuchi

(10) Patent No.: US 9,122,977 B2
(45) Date of Patent: Sep. 1, 2015

(54) IMAGE PROCESSING APPARATUS AND IMAGE PROCESSING METHOD

(71) Applicant: CANON KABUSHIKI KAISHA, Tokyo (JP)

(72) Inventor: Yohei Kiuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/273,604

(22) Filed: May 9, 2014

(65) Prior Publication Data

US 2014/0347681 A1 Nov. 27, 2014

(30) Foreign Application Priority Data

May 23, 2013 (JP) ................................. 2013-108873

(51) Int. Cl.
*H04N 1/405* (2006.01)
*G06K 15/02* (2006.01)
*G06T 11/60* (2006.01)

(52) U.S. Cl.
CPC ............ *G06K 15/1848* (2013.01); *G06T 11/60* (2013.01)

(58) Field of Classification Search
CPC ........... H04N 5/272; H04N 1/38; H04N 1/46; H04N 13/0048; G06T 11/60; G06T 2207/20144; G06T 11/001; G06T 7/0083; G06T 15/005; G06T 15/205; G06T 2210/62

USPC ........... 358/1.9, 2.1, 450, 448, 452–453, 464, 358/400, 500
See application file for complete search history.

(56) References Cited

U.S. PATENT DOCUMENTS 5,694,532 A * 12/1997 Carey et al. ................... 345/419
8,228,327 B2 * 7/2012 Hendrickson et al. ........ 345/420
8,712,784 B2 * 4/2014 Seo et al. ...................... 704/500

FOREIGN PATENT DOCUMENTS

JP 3707523 8/2005

* cited by examiner

*Primary Examiner* — Thomas D Lee
*Assistant Examiner* — Stephen M Brinich
(74) *Attorney, Agent, or Firm* — Carter, DeLuca, Farrell & Schmidt, LLP

(57) ABSTRACT

An image processing apparatus includes an obtaining unit configured to obtain a background image object and a foreground image object to be rendered with an overlap with the background image object, the background image object partially overlapping a pixel which is partially overlapped by the foreground image object; a determination unit configured to determine whether or not there is a possibility that in the pixel, the background image object is rendered instead of the foreground image object, on the basis of a rendering rule for the foreground image object and the background image object, the rendering rule for an image object being determined by a kind of attribute of the image object; and a control unit configured to control a rendering so that the background image object does not to show up in the pixel, in a case where the possibility is determined to exist by the determination unit.

25 Claims, 14 Drawing Sheets

```
DrawRect(100.9,100.9,300.3,200.3,WHITE)      ~(501)
DrawImage(100.6,100.6,300.6,200.6,image1)    ~(502)
DrawRect(100.9,200.9,300.3,300.3,WHITE)      ~(503)
DrawImage(100.6,200.6,300.6,300.6,image2)    ~(504)
DrawRect(100.9,300.9,300.3,400.3,WHITE)      ~(505)
DrawImage(100.6,300.6,300.6,400.6,image3)    ~(506)
DrawRect(100.9,400.9,300.3,500.3,WHITE)      ~(507)
DrawImage(100.6,400.6,300.6,500.6,image4)    ~(508)
ShowPage()                                    ~(509)
```

FIG.5

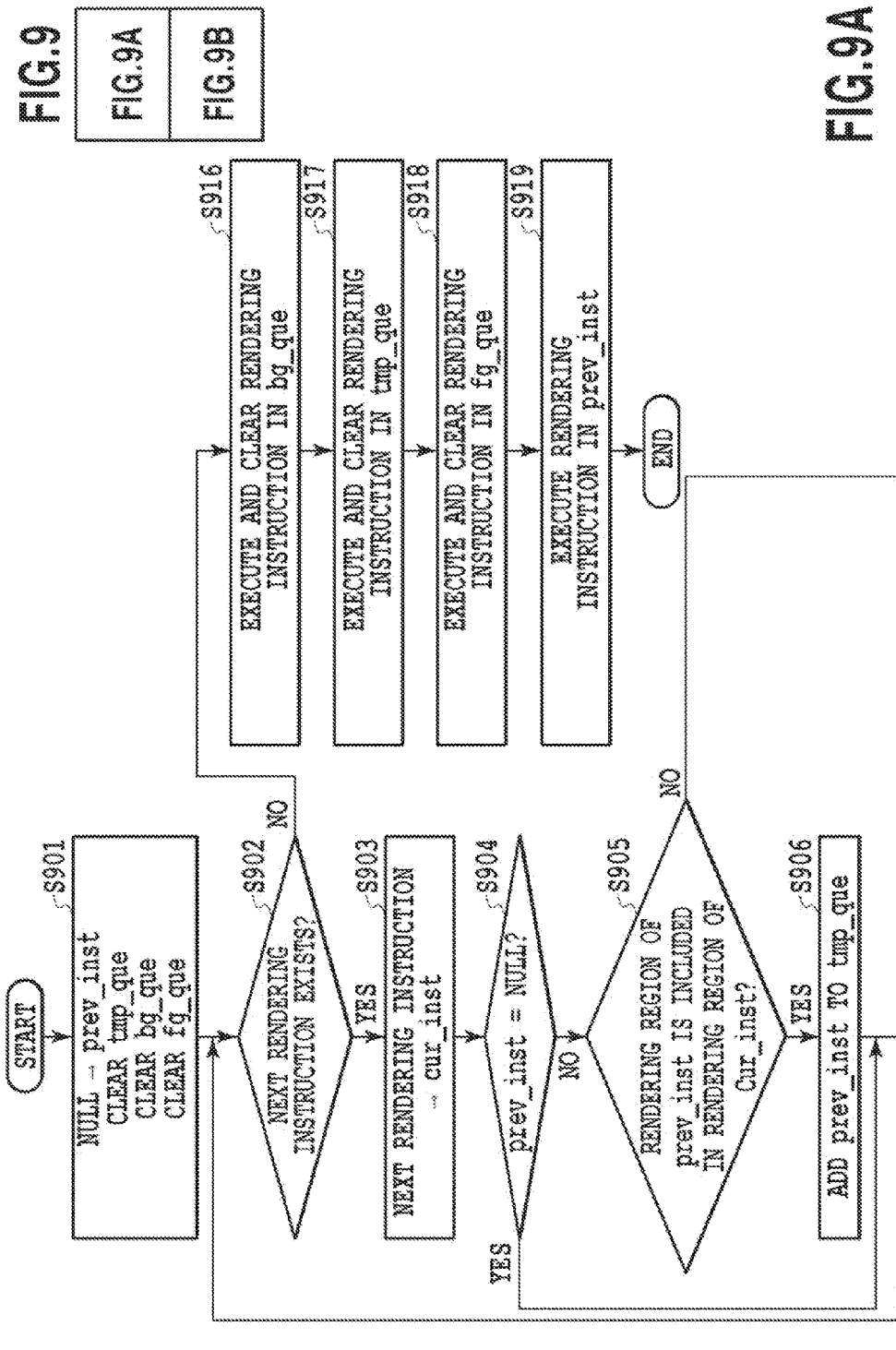

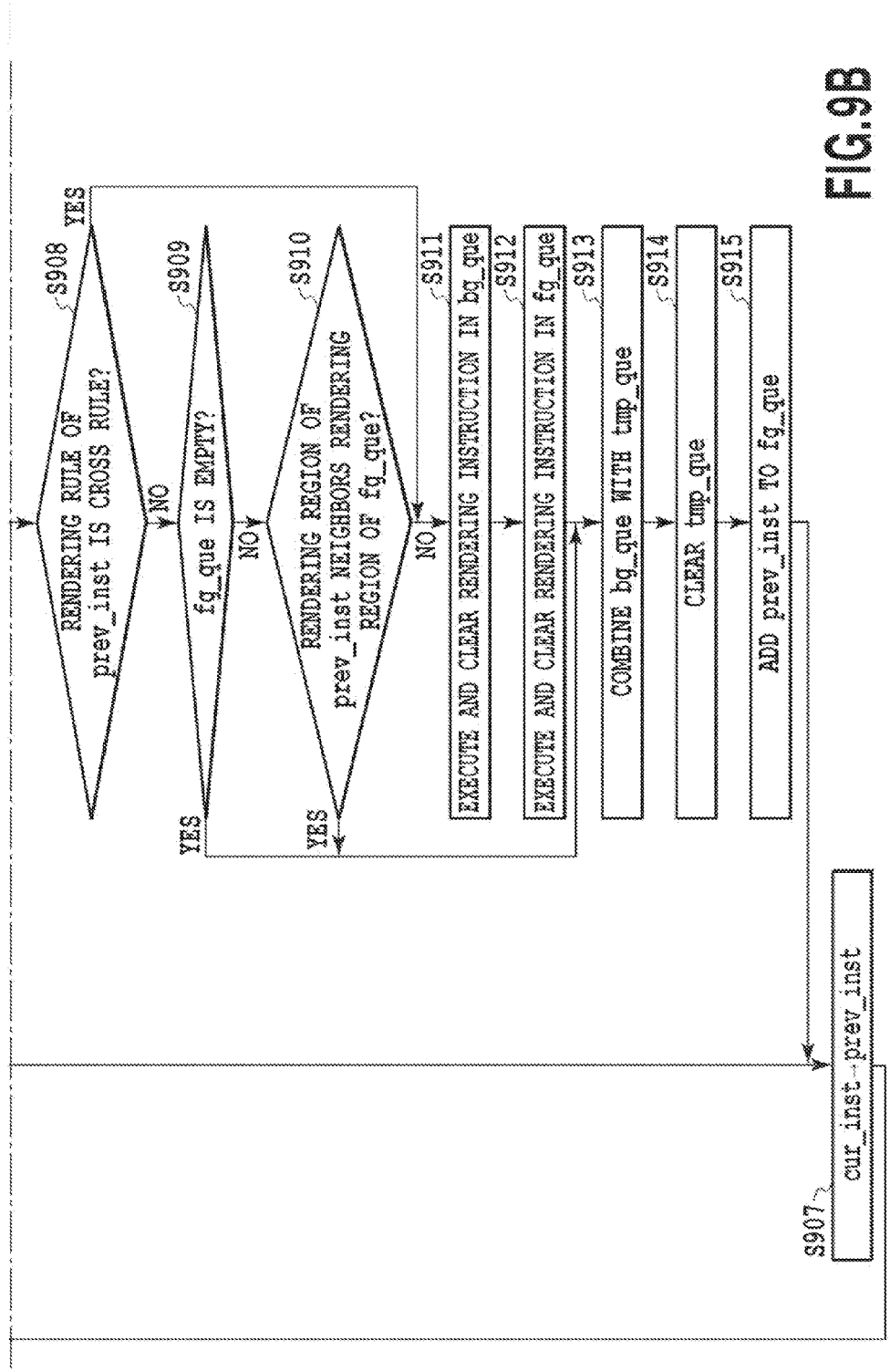

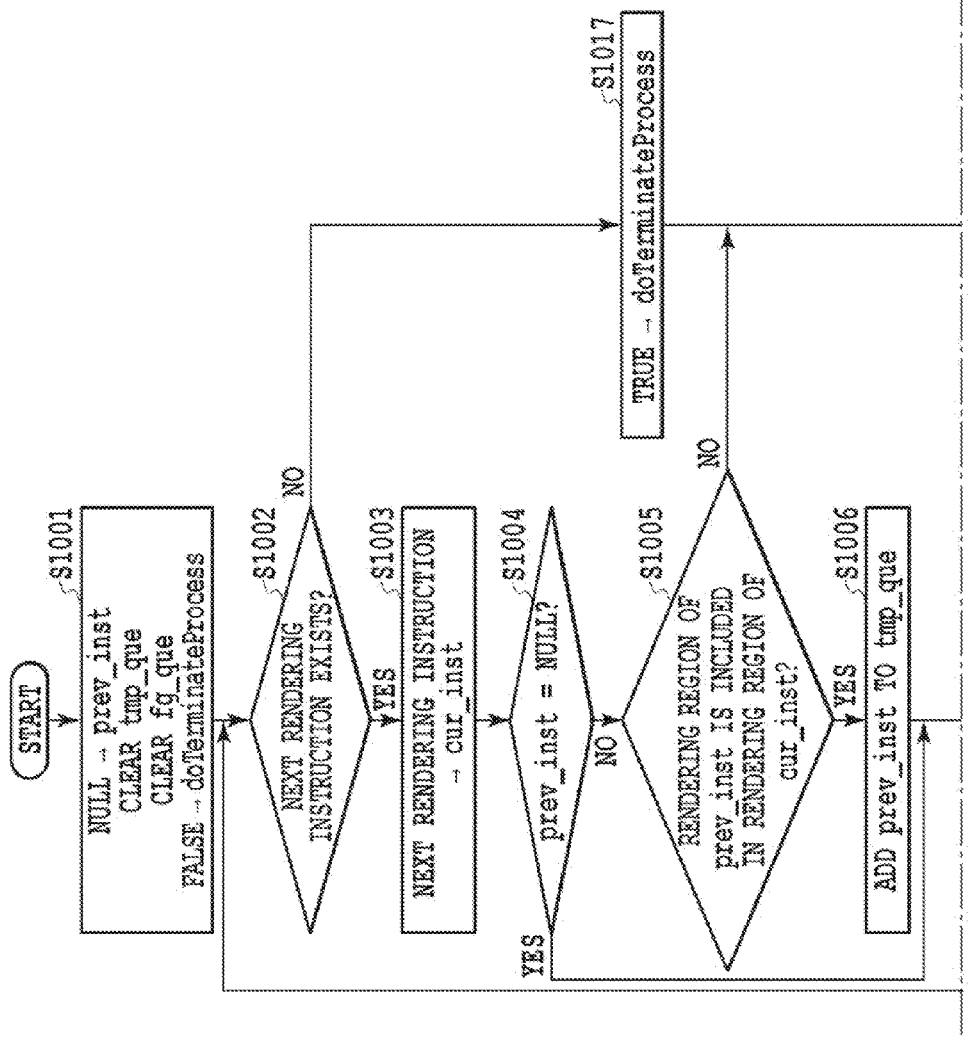

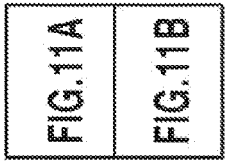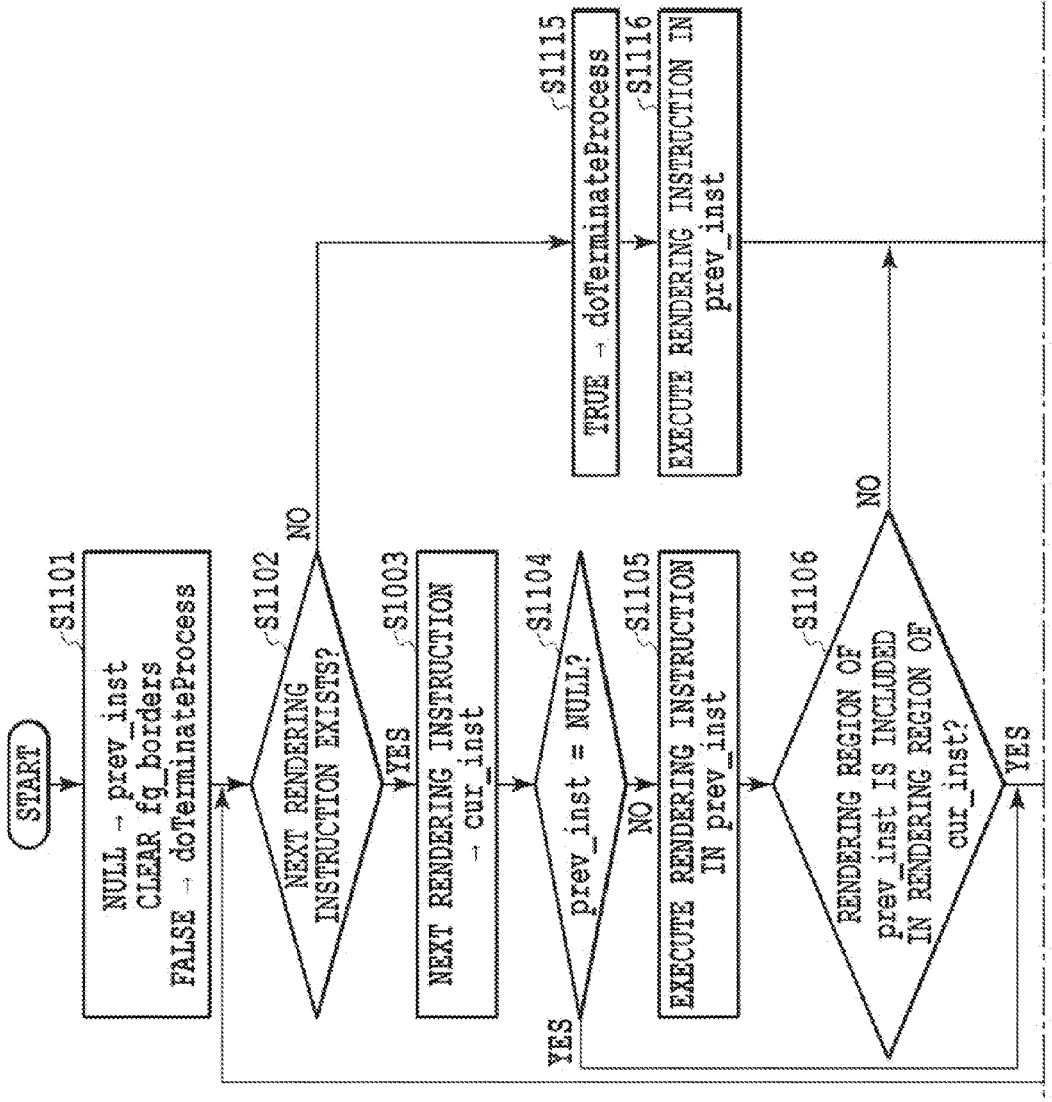

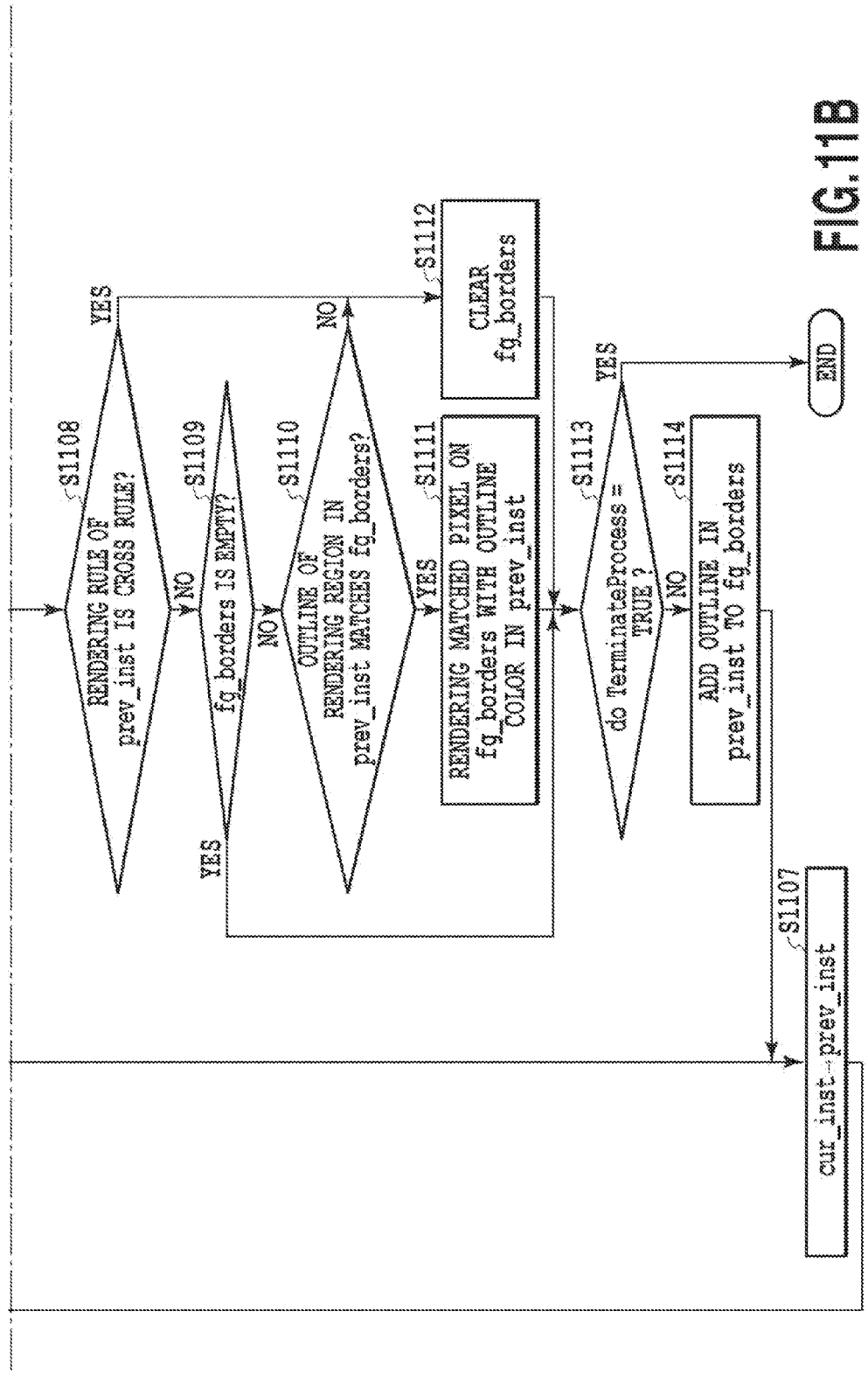

IMAGE PROCESSING APPARATUS AND IMAGE PROCESSING METHOD

BACKGROUND OF THE INVENTION

1. Field of the Invention

The present invention relates to an image processing apparatus and an image processing method, and in more detail, relates to an image processing apparatus and an image processing method which perform processing of superimposing a foreground image object on a background image object.

2. Description of the Related Art

Conventionally, an image formation system is able to generate print information suitable for the image formation system on the basis of input information and to perform image output. Specifically, the image formation system changes an image processing parameter on the basis of attribute information included in an input rendering instruction and generates the image. Here, the attribute information is information indicating a kind of rendering instruction such as text, line, graphic, and image, for example.

Even for the rendering instruction which is an instruction of filling the same region, a rule to be used in determining the color of a pixel according to the rendering instruction (rendering rule for the rendering instruction) is sometimes different in a case of the different attribute information such as graphic and image. For example, rendering processing of PostScript (registered trademark) defines a different rendering rule depending on the attribute information. In rendering process of an object having the line, text, or graphic attribute, a pixel which crosses a rendering region of the object even slightly is filled. Hereinafter, this rule is called as a cross rule. In rendering process of an object having the image attribute, only a pixel which has the center within a rendering region of the object is filled. Hereinafter, this rule is called as a center rule. The fact that the rendering rule for a pixel unit is different depending on the attribute information is not limited to PostScript (registered trademark), and there are similar cases in other page description languages.

Meanwhile, through the recent diversification of applications and OS, the rendering instruction becomes complicated and the load on the rendering processing or image processing is being increased. For performing high-speed processing of the complicated rendering instruction, sometimes the image of one object (called an object image) is divided into a plurality of rendering instructions by an application for convenience of computer processing. The reason is that, for example, data amount becomes extremely larger as the size of the object image becomes larger, and the load on processing resources becomes heavy for performing processing of the object collectively. Generally, in object image division processing by an application, an object image is divided into a plurality of rendering regions adjacent to each other. In other words, originally one object image is divided into a plurality of rendering instructions. One or a plurality of backside rendering instructions for rendering a background object and one front-side rendering instruction for rendering a foreground object are issued for each of the rendering regions. Meanwhile, the order of the rendering regions to be processed is determined by a rendering direction (for example, from the bottom to the top of a page). As to each of the rendering regions, the backside rendering instruction is issued first, and the front-side rendering instruction is issued last.

Here, whether or not the image obtained by the rendering result of the plurality of rendering instructions after the division was the originally one object image is referred to as integrity of the rendering instruction. As a technique of determining the integrity of the divided rendering instructions during the rendering, there is a technique of determining the integrity of the rendering instructions by using content information including region arrangement information, an enlargement factor, resolution, default set color, and the like in the rendering instruction (refer to Japanese Patent No. 3707523).

In the technique of Japanese Patent No. 3707523, however, no particular consideration is given to the rendering rule for the rendering instruction. There is a case where, in performing the rendering instruction which is divided by an application, a line having a background color which does not exist in an original object appears at a border part of the rendering region because of a difference in the rendering rule for filling a pixel between a background object and a foreground object. The technique of Japanese Patent No. 3707523 cannot pre-detect such a phenomenon. Hereinafter, an occurrence of such phenomenon will be explained specifically by the use of FIG. 4 to FIG. 7.

FIG. 4 is an example of an object image on an application. An object image 400 in FIG. 4 is an original object image to be processed by the application.

FIG. 5 is an example of the rendering instructions generated by the application. For high-speed processing of complicated rendering instruction, an application sometimes generates a divided plurality of rendering instructions for an object image. In FIG. 5, a graphic (for example, in white background color) rendering instruction is divided into four graphic rendering instructions for rendering the rendering regions of a graphic. An image rendering instruction is divided into four image rendering instructions for rendering object images on the front-side of the graphic. Further, a page output instruction 509 of outputting the page is included. The attribute information of the graphic rendering instructions 501, 503, 505, and 507 is graphic and the attribute information of the image rendering instructions 502, 504, 506, and 508 is image. The first argument to the fourth argument in the graphic rendering instruction and the image rendering instruction express the X-coordinate and Y-coordinate at the lower left-hand corner of the rendering region and the X-coordinate and Y-coordinate of the upper right-hand corner of the rendering region, respectively. The unit of the coordinate thereof is pt (point: 1/72 inches). The fifth argument in the graphic rendering instruction expresses a rendering color, that is, white color in this example. The fifth argument in the image rendering instruction expresses an image data storage variable. The contents of the image data are omitted in this example.

The rendering instructions are issued in order of 501, 502, 503, . . . , and the rendering is performed in accordance with the last issued rendering instruction in a case where the rendering regions overlap each other. Generally, frequently in the division processing of the object image in an application, one or a plurality of backside rendering instructions and a front-side rendering instruction(s) which regionally includes the backside rendering instructions are generated as one unit for a series of the rendering instructions regionally adjacent to each other. In this example, the graphic rendering instructions 501, 503, 505, and 507 are the backside rendering instructions, and the image rendering instructions 502, 504, 506, and 508 are the front-side rendering instructions which regionally include the graphic rendering instructions 501, 503, 505, and 507, respectively.

FIG. 6A is a diagram schematically showing a positional relationship of the objects which are rendered by the rendering instructions of FIG. 5. Graphics 601, 603, 605, and 607 are background objects which are rendered by the graphic rendering instructions 501, 503, 505, and 507 (backside rendering instructions), respectively. The images 602, 604, 606, and 608 are foreground objects which are rendered by the image rendering instructions 502, 504, 506, and 508 (frontside rendering instructions), respectively. The graphics 601, 603, 605, and 607 have differences between the coordinates of the adjacent outlines and are not adjacent to each other. Although an example in which the graphics 601, 603, 605, and 607 are not adjacent to each other has been shown here, explanation of processing is the same even in a case of being adjacent to each other. The images 602, 604, 606, and 608 have completely the same coordinates in the adjacent outlines and are adjacent to each other. In this manner, the regions of the images 602, 604, 606, and 608 completely include the regions of the graphics 601, 603, 605, and 607, respectively, and are positioned on the front-side.

FIG. 6B is a diagram obtained by enlarging a partial region 609 on a border between the image 602 and the image 604. FIG. 6B shows a pixel 610 and the center 611 thereof. The size of the pixel 610 depends on the resolution of the image processing system. Here, for simplicity, the size of the pixel is 1.0 pt. In this example, all of the outline 612 of the graphic 601, the outline 614 of the graphic 603, and the border 613 between the image 602 and the image 604 pass through the pixel 610. Here, the "outline" is used as a word meaning a line dividing the inside and the outside of a region, and the "border" is used as a word meaning a line where the two adjacent regions make contact with each other.

Since the graphics 601 and 603 are rendered by the cross rule according to the rendering rule for PostScript (registered trademark), the pixel 610 in the rendering region is filled. On the other side, since the images 602 and 604 are rendered by the center rule, only the image 602 in which the center 611 of the pixel 610 is within the rendering region fills the pixel 610 and the image 604 does not fill the pixel 610. That is, according to the rendering rule, the graphic 601 of the background object, the image 602 of the foreground object, and the graphic 603 of the background object fill the pixel 610. The image 604 of the foreground object does not fill the pixel 610. Furthermore, since the rendering is performed according to the last issued rendering instruction in a case where the rendering regions overlap each other, the pixel 610 is filled with the color of the graphic 603 of the background object.

FIG. 7 is a diagram schematically expressing a rendering result of the rendering instructions of FIG. 5. The pixels positioned on the borders between the images 602, 604, 606, and 608 of the foreground objects are filled with the colors of the graphics 603, 605, and 607 of the background objects and appear as white lines 701 having a width of one pixel. This line does not exist in the original object image 400 and is recognized as being undesirable by a user. Please note that, in FIG. 7, the outline of the white line 701 is added for explanation and is not rendered actually.

As described above, in the technique of Japanese Patent No. 3707523, no particular consideration is given to the rendering rule for the rendering instruction. Therefore, with use of the technique, it is not possible to detect the rendering in the border part between the objects rendered by the divided rendering instructions which is occurred by the difference in the rendering rule for filling the pixel between the background object and the foreground object.

SUMMARY OF THE INVENTION

An image processing apparatus of the present invention is an image processing apparatus includes an obtaining unit configured to obtain a background image object and a foreground image object to be rendered with an overlap with the background image object, the background image object partially overlapping a pixel which is partially overlapped by the foreground image object; a determination unit configured to determine whether or not there is a possibility that in the pixel, the background image object is rendered instead of the foreground image object, on the basis of a rendering rule for the foreground image object and the background image object, the rendering rule for an image object being determined by a kind of attribute of the image object; and a control unit configured to control a rendering so that the background image object does not to show up in the pixel, in a case where the possibility is determined to exist by the determination unit.

According to the present disclosure, it is possible to determine a condition under which a rendering caused by division processing of an object image may be occurred, in consideration of the rendering rule for a rendering instruction.

Further features of the present invention will become apparent from the following description of exemplary embodiments (with reference to the attached drawings).

BRIEF DESCRIPTION OF THE DRAWINGS

FIG. 5 is an example of rendering instructions generated by an application;

FIG. 9 is a diagram showing the relationship of FIGS. 9A and 9B;

FIGS. 9A and 9B are a flowchart showing rendering processing of an image forming apparatus 100 in Example 1;

FIG. 10 is a diagram showing the relationship of FIGS. 10A and 10B;

FIGS. 10A and 10B are a flowchart showing rendering processing of an image forming apparatus 100 in Example 2;

FIG. 11 is a diagram showing the relationship of FIGS. 11A and 11B; and FIGS. 11A and 11B are a flowchart showing rendering processing of an image forming apparatus 100 in Example 3.

DESCRIPTION OF THE EMBODIMENTS

Hereinafter, embodiments will be explained by the use of the drawings.

<Configuration of an Image Formation System>

Figure 1:
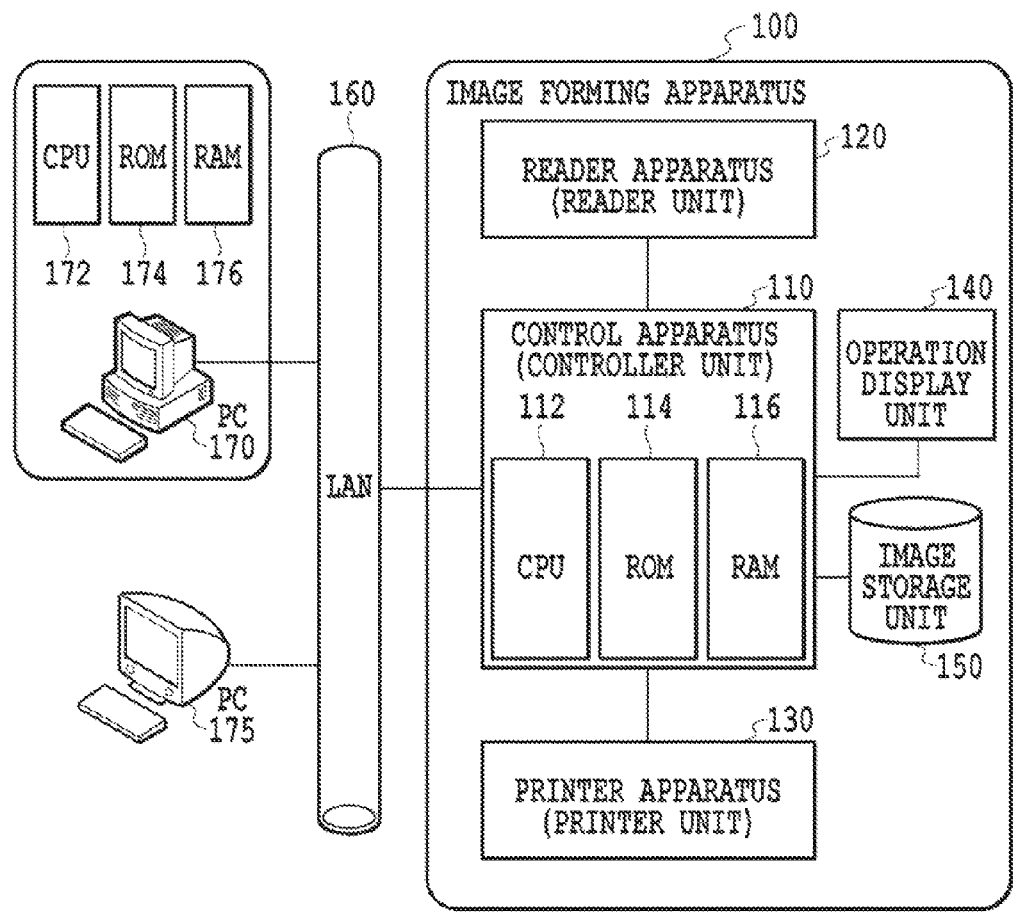
FIG. 1 is a block diagram showing a configuration of an image formation system in an embodiment.

FIG. 1 is a diagram showing a configuration of an image formation system in the present embodiment. As shown in FIG. 1, the image formation system in the present embodiment is provided with an image formation system 100 and host computers (PC) 170 and 175 which are connected to the image forming apparatus 100 via LAN (Local Area Network) 160 such as Ethernet (registered trademark).

The image forming apparatus 100 includes a reader apparatus 120, a printer apparatus 130, an operation display unit 140, an image storage unit 150, and also a control apparatus (controller unit) 110 configured to control each of these constituents.

The control apparatus 110 includes CPU 112, ROM. 114, RAM 116, and the like, and CPU 112 controls the whole image forming apparatus 100 integratedly on the basis of a program stored in ROM 114, RAM 116, or another storage medium. For example, the control apparatus 110 has a configuration of causing CPU 112 to load a predetermined program for performing each of PDL analysis processing, display list generation processing, rendering processing, and the like. In addition, as to the rendering processing, although not described here, dedicated hardware may be utilized.

The printer apparatus 130 performs image data output. The operation display unit 140 is provided with a key board performing operation of various kinds of print setting for image output processing, and a liquid crystal panel displaying an operation button and the like for performing image output setting. The image storage unit 150 can store print data such as image data, document data, and a printer control language (for example, ESC code or PDL (Page Description Language)). For example, the image storage unit 150 can store image data, document data, and PDL received from the host computer (PC) 170 via the LAN 160, and image data and the like read by controlling the reader apparatus 120. In the present embodiment, there is used MFP (Multi Function Printer) as an example for explaining the image forming apparatus 100. Obviously, it is needless to say that SFP (Single Function Printer), LBP (Laser Beam Printer), and a printer having another print method may be used.

<Configuration of a Software Module Operating in the Image Forming Apparatus 100>

Figure 2:
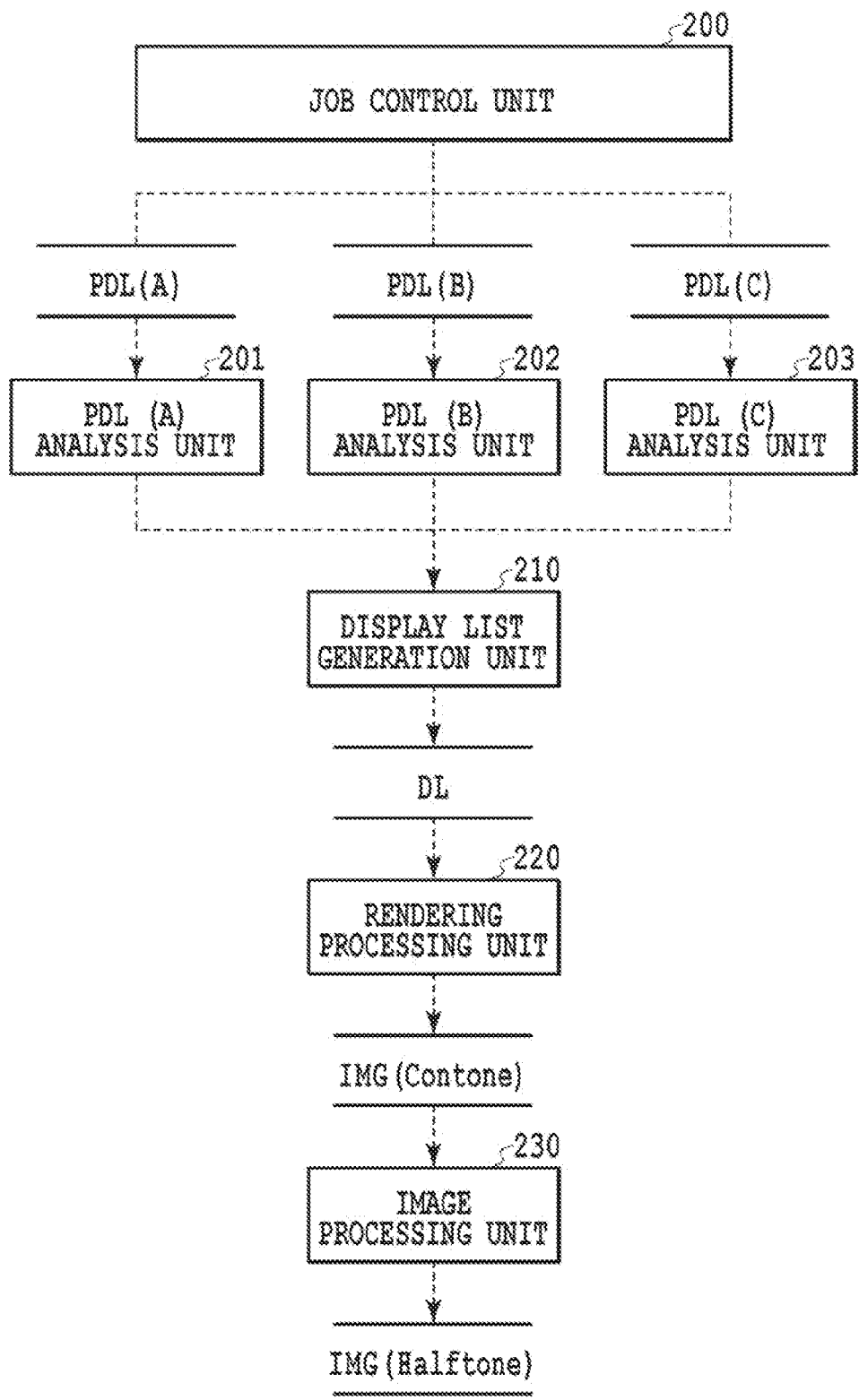
FIG. 2 is a diagram of a software module operating on a control apparatus 110 in an embodiment.

FIG. 2 is a diagram showing a configuration of a software module operating in the control apparatus 110 of the image forming apparatus 100 in the present embodiment. This software is stored in ROM 114 in the image forming apparatus 100, and is developed to RAM 116 in activation and executed by CPU 112 for operation.

A job control unit 200 controls a print job from input to output by way of function call, message communication, and the like.

The PDL analysis units 201, 202, and 203 exist in the number corresponding to the number of kinds of PDL (for example, PostScript, PCL, XPS, and the like) installed in the image forming apparatus 100. Each of the PDL analysis units 201, 202, and 203 reads PDL data stored in a PDL reception buffer (not shown) and executes analysis processing, in accordance with control from the job control unit 200.

The display list generation unit 210 executes processing according to control from the job control unit 200 and according to rendering information delivered by the PDL analysis units 201, 202, and 203, and stores a generated display list into a memory.

The rendering processing unit 220 loads the display list from RAM 116, converts the display list into image data by executing rendering processing, and performs processing of outputting the image to the image storage unit 150.

The image processing unit 230 loads a rendered bitmap image and an attribute bitmap image from the image storage unit 150, and executes image processing by using the most suitable image processing parameter in accordance with the attribute. Together with the image processing, the image processing unit 230 performs processing of converting contone image data into halftone image data and outputting the result to the image storage unit 150.

<Configuration of a Rendering Correction Processing Software Module Operating in the Image Forming Apparatus 100>

Figure 3:
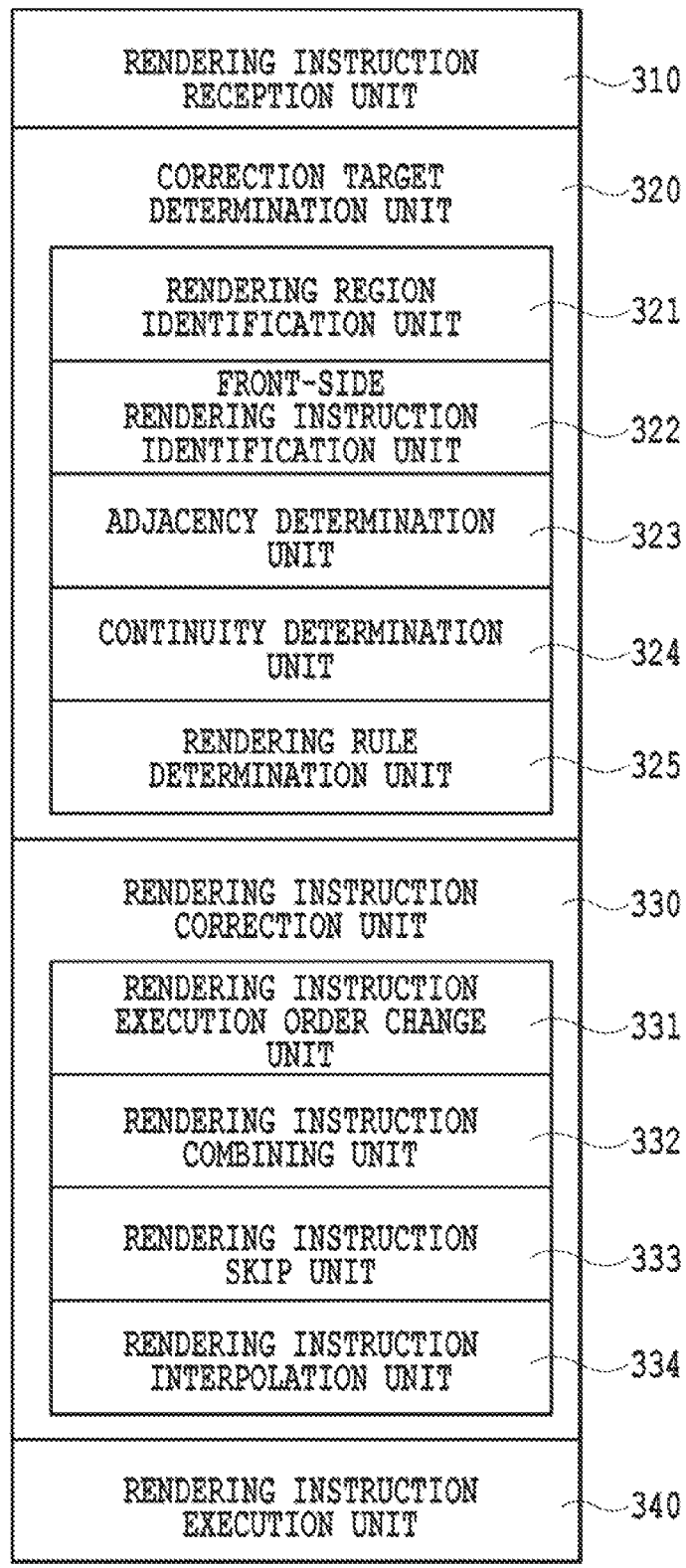
FIG. 3 is a diagram of a rendering correction processing software module operating on a control apparatus 110 in an embodiment.
Figure 4:
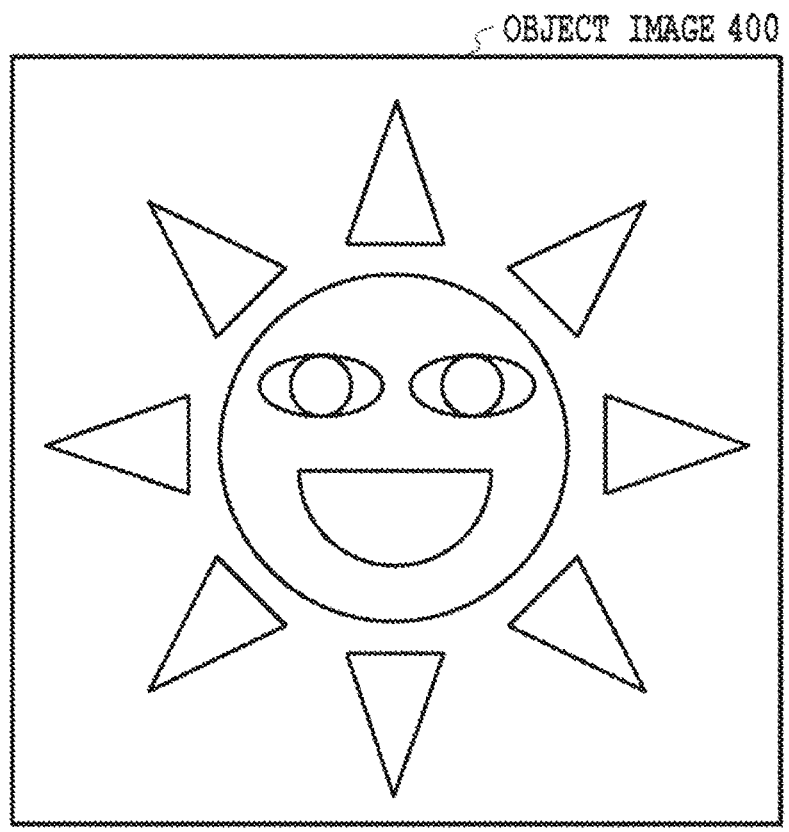
FIG. 4 is an example of an object image in an application.
Figure 6A:
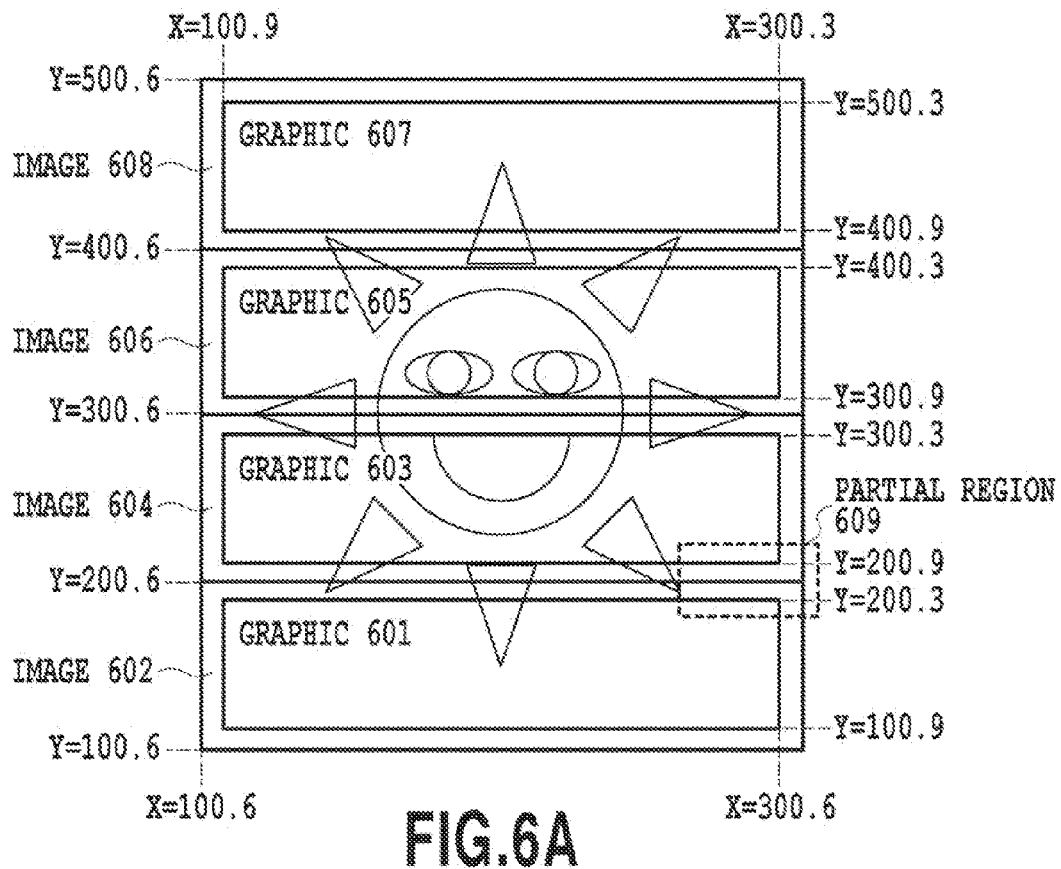
FIG. 6A and FIG. 6B are diagrams schematically showing positional relationships of objects rendered by rendering instructions.
Figure 6B:
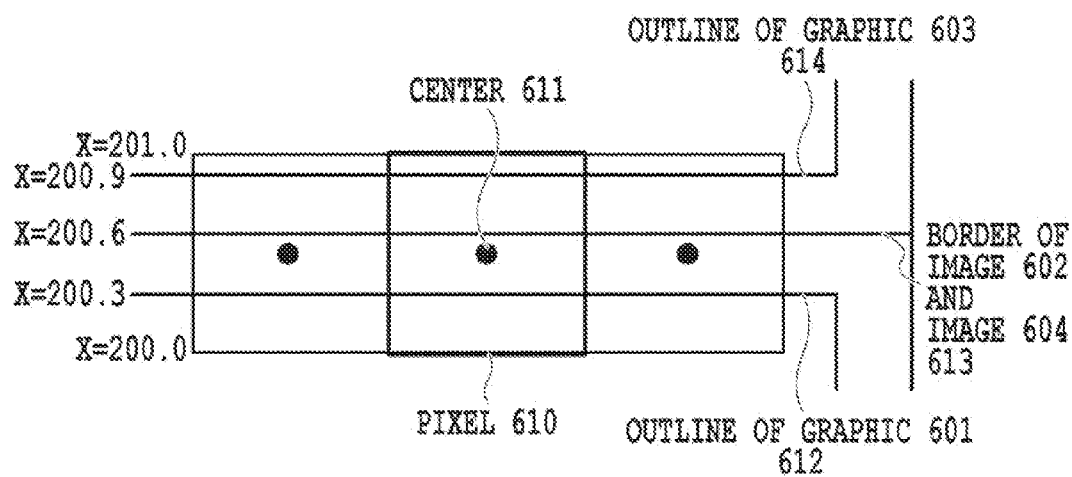
Figure 7:
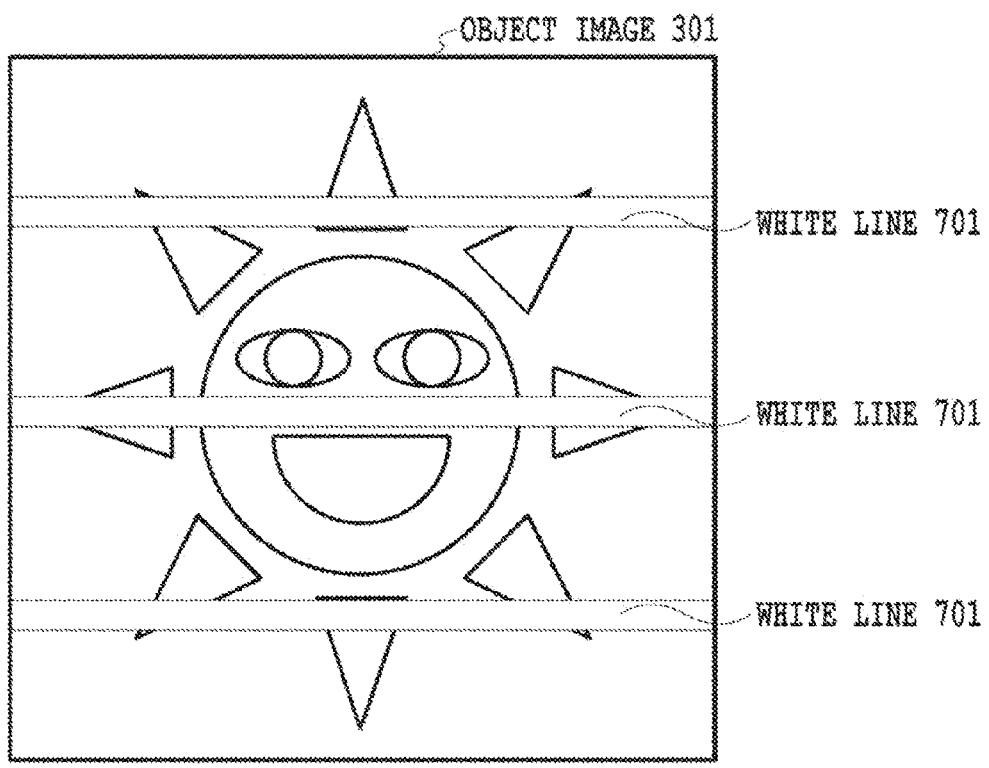
FIG. 7 is a diagram schematically showing a rendering result of rendering instructions.

FIG. 3 is a diagram showing a configuration of a rendering correction processing software module included in the PDL analysis units 201, 202, and 203 in the present embodiment.

A rendering instruction reception unit 310 receives a rendering instruction included in PDL. As shown in FIG. 5, PDL includes a plurality of rendering instructions.

A correction target determination unit 320 includes a rendering region identification unit 321, a front-side rendering instruction identification unit 322, an adjacency determination unit 323, a continuity determination unit 324, and a rendering rule determination unit 325, and determines rendering processing of a correction target in the rendering instruction received by the rendering instruction reception unit 310.

The rendering region identification unit 321 identifies a rendering region for the rendering instruction from region arrangement information included in the rendering instruction. The rendering region for the rendering instruction means a region to be rendered for an object rendered by the rendering instruction.

The front-side rendering instruction identification unit 322 identifies the front-side rendering instruction by using rendering region information included in the rendering instruction. The adjacency determination unit 323 determines a regional adjacency of the rendering instructions. The continuity determination unit 324 identifies a largest unit in which all the front-side rendering instructions are adjacent to each other in the continuing rendering instructions. The rendering rule determination unit 325 determines a rendering rule for the rendering instruction.

A rendering instruction correction unit 330 includes a rendering instruction execution order change unit 331, a rendering instruction combining unit 332, a rendering instruction skip unit 333, a rendering instruction interpolation unit 334, and performs correction processing on the rendering instruction identified by the correction target determination unit 320 as a correction target. The rendering instruction execution order change unit 331 changes the execution order of the rendering instruction so as to cause the front-side rendering instruction to be executed after the backside rendering instruction has been executed first. The rendering instruction combining unit 332 combines the front-side rendering instructions together. The rendering instruction skip unit 333 skips backside rendering processing. The rendering instruction interpolation unit 334 fills a pixel in the border part of the rendering instruction, by any of the front-side rendering instructions.

A rendering instruction execution unit 340 executes the rendering processing according to the rendering instruction corrected by the rendering instruction correction unit.

This rendering correction software may be implemented in the display list generation unit 210, the rendering processing unit 220, or the image processing unit 230, not in the PDL analysis units 201, 202, or 203. Furthermore, the rendering correction processing software may be implemented divided into a plurality of modules, or dedicated hardware may be utilized. Processing details of this rendering correction processing software will be described below with reference to FIG. 9 to FIG. 11.

<Rendering Rule in the Image Forming Apparatus 100>

Figure 8:
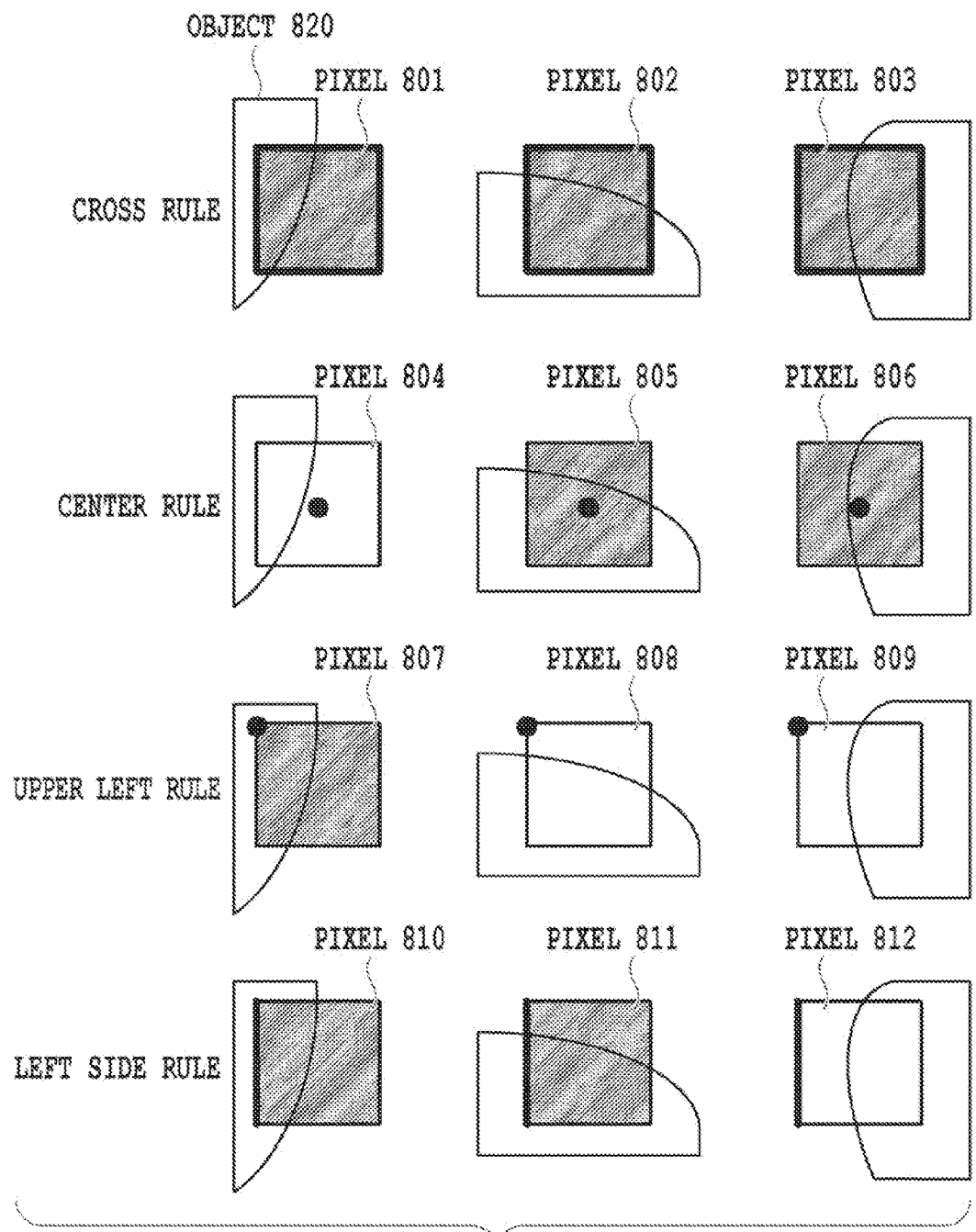
FIG. 8 is a diagram for explaining rendering rules of an image forming apparatus 100 in an embodiment.

FIG. 8 is a diagram for explaining a rendering rule in the image forming apparatus 100 of the present embodiment. Although example of the rendering rules include a cross rule, a center rule, an upper left rule, a left side rule, and the like, shown in FIG. 8, the other rules may be used. The size of pixels 801 to 812 shown in FIG. 8 depends on the resolution of the image forming apparatus 100. Usually, in a case where the image forming apparatus 100 has a resolution of 600 dpi, the size of the pixels becomes 1/600=0.00167 inches. Furthermore, in a case where the image forming apparatus 100 has a resolution of 1200 dpi, the size of the pixels becomes 1/1200=0.00083 inches. An object 820 shown in FIG. 8 expresses an object rendered by a rendering instruction and partially overlaps the pixels 801 to 812.

In the cross rule, the object 820 fills a pixel crossing the region of the object 820 even slightly. Accordingly, the object 820 fills pixels 801, 802, and 803.

In the center rule, the object 820 fills only a pixel having the pixel center within the region of the object 820. Accordingly, the object 820 fills pixels 805 and 806 but does not fill a pixel 804.

In the upper left rule, the object 820 fills only a pixel having a upper left vertex, within the region of the object 820. Accordingly, the object 820 fills a pixel 807 but does not fill pixels 808 or 809.

In the left side rule, the object 820 fills the pixel in which the left side of the pixel is included in the region of the object 820, and the pixel in which the left side of the pixel crosses the region of the object 820 even slightly. Accordingly, the object 820 fills pixels 810 and 811, but does not fill a pixel 812.

In the present embodiment, an object of line, text, or graphic is rendered by the cross rule, and an object of image is rendered by the center rule. Therefore, the rendering rule can be determined by the attribute information of the rendering instruction. However, the target of the present invention is not limited thereto if a plurality of rendering rules is mixed within a page, and for example, the rendering rule may be designated for each rendering instruction, or the rendering rule may be switched by the other conditions. Furthermore, also the rendering rule is not limited to the above explained rendering rules.

Example 1

Hereinafter, processing specific to Example 1 will be explained. Meanwhile, Example 1 determines a condition under which a rendering caused by the division processing of an object image (Hereinafter, called as an artifact) may be occurred, and generates an object image without the artifact by changing the execution order of the rendering instructions or combining the front-side rendering instructions together. Please note that the "artifact" described in the embodiments is a name and is not caused by a process error in the image forming apparatus of the embodiments.

<Rendering Processing in the Image Forming Apparatus 100>

FIGS. 9A and 9B are a flowchart showing rendering processing in the image forming apparatus 100 of the present example.

In the rendering processing of FIGS. 9A and 9B, a processing target rendering instruction cur_inst storing the latest rendering instruction of a current processing target, and a previous rendering instruction prev_inst storing the rendering instruction processed previously are used as variables. Furthermore, a temporary queue tmp_que, a foreground queue fg_que, and a background queue bg_que are used as queues. The temporary queue tmp_que is a queue spooling the rendering instruction temporarily, and is used for suspending the execution of the rendering instruction until the front-side rendering instruction is found. In a case where the front-side rendering instruction is found, the rendering instruction in the temporary queue tmp_que is moved to the background queue bg_que as the backside rendering instruction and the front-side rendering instruction is added to the foreground queue fg_que. The foreground fg_que is a queue spooling the front-side rendering instruction, and is used for suspending the execution of the front-side rendering instruction as long as the front-side rendering instructions are adjacent to each other continuously. The background queue bg_que is a queue spooling the backside rendering instruction, and is used for suspending the execution of the backside rendering instruction during the same period as the foreground queue fg_que. By suspending, separating, and spooling the execution of the backside rendering instruction and the front-side rendering instruction in this manner, it becomes possible to change the execution order of the rendering instructions and to selectively combine only the front-side rendering instructions together.

The rendering processing shown in the flowchart of FIGS. 9A and 9B is executed by CPU 112 having executed a program stored in RAM 116. The rendering processing is executed page by page. Hereinafter, processing for each step of the rendering processing will be explained.

In step S901, CPU 112 initializes the variables, the queues, and the like to be used in the subsequent processing. That is, the previous rendering instruction prev_inst is initialized to NULL, and the temporary queue tmp_que, the background queue bg_que, and the foreground queue fg_que are cleared to be empty.

In step S902, CPU 112 determines whether or not the next rendering instruction exists. In a case where the next rendering instruction is determined to exist (YES), CPU 112 reads the next rendering instruction and goes to step S903. In a case where the next rendering instruction is determined not to exist (NO), CPU 112 goes to step S916.

In step S903, CPU 112 sets the value of the rendering instruction read in step S902 to the processing target rendering instruction cur_inst.

In step S904, CPU 112 determines whether or not the previous rendering instruction prev_inst is NULL. In a case where the determination is made to be NULL (YES), the flow goes to step S907. In a case where the determination is made not to be NULL (NO), the flow goes to step S905.

In step S905, CPU 112 determines whether or not the rendering region of the previous rendering instruction prev_inst is included in the rendering region of the processing target rendering instruction cur_inst. Also in a case where the rendering regions are the same, it is determined that the rendering region is included. In a case where the determination is made to be included (YES), the flow goes to step S906. In a case where the determination is made not be included (NO), the flow goes to step S908. By the processing of the present step, the determination can be made whether or not the rendering region of the rendering instruction is included in the rendering region of the following rendering instruction, and in a case where the rendering region is included, the rendering region of the previous rendering instruction prev_inst can be determined to be the rendering region of the backside rendering instruction, and in a case where the rendering region is not included, the rendering region of the previous rendering instruction prev_inst can be determined to be the rendering region of the front-side rendering instruction.

In step S906, CPU 112 adds the rendering instruction stored in the previous instruction pev_inst (backside rendering instruction identified in step S905) to the temporary queue tmp_que.

In step S907, CPU 112 sets the value of processing target rendering instruction cur_inst to the previous rendering instruction prev_inst.

By the processing of step S902 to step S907, the backside rendering instruction is stored in tmp_que. On the other side, in a case where the determination is NO in step S905, the value of the previous rendering instruction prev_inst is determined to be the front-side rendering instruction and the processing goes to step S908.

In step S908, it is determined whether or not the rendering rule for the previous rendering instruction prev_inst (rendering rule for the front-side rendering instruction identified in step S905) is a cross rule. In the present example, since the rendering rule corresponds to the attribute information of the rendering instruction, the determination in the present step is performed by the determination that the rendering rule is the cross rule in a case where the attribute information of the previous rendering instruction prev_inst is any of line, text, and graphic. In a case where the rendering rule for the front-side rendering instruction is the cross rule, the pixel in the border part (common outline) between the front-side rendering instruction and the previous front-side rendering instruction is invariably filled by the front-side rendering instruction, and the artifact is not caused. Therefore, the change of the execution order needs not be performed among the front-side rendering instruction, the backside rendering instruction having a rendering region included in the rendering region of the front-side rendering instruction, and the previous rendering instructions. On the other hand, in a case where the rendering rule for the front-side rendering instruction is not the cross rule, it is determined that the artifact caused by the division processing of the object image may be occurred (there is a possibility that the undesirable rendering using the background image object without using the foreground image object is performed in the outline pixel of the foreground image object). In the present step, in a case where the determination is made to be the cross rule (YES), the flow goes to step S911, and in a case where the determination is made not to be the cross rule (NO), the flow goes to step S909.

Meanwhile, the flow may skip the determination processing of the present step and go to step S909. In addition, while it has been explained here that the artifact is determined not to be caused if the rendering rule for the front-side rendering instruction is the cross rule in a case where the cross rule and the center rule are mixed, another method may be used for preventing the artifact in the present step. For example, in a case where the upper left rule and the center rule are mixed and also the rendering instruction indicates the rendering from the bottom to the top of a page, the artifact is not caused if the rendering rule for the front-side rendering instruction is the upper left rule, and thus in such a case, the flow may be controlled so as to go to step S911.

In step S909, CPU 112 determines whether or not the foreground queue fg_que is empty. In a case where the foreground queue is determined to be empty (YES), the flow goes to step S913. In a case where the foreground queue is determined not to be empty (NO), the flow goes to step S910.

In step S910, CPU 112 determines whether or not the rendering region of the previous rendering instruction prev_inst (rendering region of the front-side rendering instruction identified in step S905) is adjacent to the rendering region of the rendering instruction stored in the foreground queue fg_que. Here, the fact that the rendering regions are adjacent to each other means a state in which parts of the outlines in the objects rendered by rendering instructions spatially adjacent to each other have completely the same coordinates, and for example, a case where the coordinates of sides in two adjacent rectangles (images in a band unit) are coincident with each other corresponds to this case. For example, the image rendering instructions 502 and 504 are adjacent to each other, since parts of the outlines in the images 602 and 604 rendered by the rendering instructions 502 and 504 are coincident with each other in a line segment connecting a point (X=100.9, Y=200.6) and a point (X=300.6, Y=200.6). On the other side, the graphic rendering instructions 501 and 503 are not adjacent to each other, since the outlines of the graphics 601 and 603 rendered by the rendering instructions do not include the parts having the same coordinates. It suffices that the parts of the outlines have only to have the same coordinates, and the regions except these parts may overlap each other.

By the processing of step S910, it is possible to determine whether or not the front-side rendering instructions identified in step S905 are adjacent to each other (to detect the adjacent foreground image objects). In a case where the front-side rendering instructions are not adjacent to each other, since the artifact caused by the division processing of the object image is not occurred, the change of the execution order among the front-side rendering instruction, the backside rendering instruction included in the rendering region, and the previous rendering instructions needs not be performed. In a case where the determination is made as being adjacent (YES) in step S910, the flow goes to step S913, and in a case where the determination is made not to be adjacent (NO), the flow goes to step S911. Specifically, in a case where the front-side rendering instructions are determined not to be adjacent to each other, in the processing of step S911 and the subsequent steps, CPU 112 performs processing of executing and clearing the spooled rendering instruction, and after that, newly starts the spool of the rendering instruction. In a case where the front-side rendering instructions are determined to be adjacent to each other, CPU 112 continues the spool of the rendering instruction in the processing in step S913 and the subsequent steps. By such a configuration, the processing can be applied to the largest unit of a series of the rendering instructions in which all the front-side rendering instructions are adjacent to each other, and it is possible to improve determination accuracy in the integrity of the rendering instructions. Furthermore, since the spool of the rendering instruction is started newly in a case where the front-side rendering instructions are not adjacent to each other, it is possible to perform the processing at high speed while saving memory, compared with the method of spooling the rendering instructions over the entire page.

In step S911, CPU 112 executes and clears the rendering instruction of the background queue bg_que. Here, CPU 112 executes the rendering instructions in order of having stored the rendering instructions into the background queue bg_que.

In step S912, CPU 112 executes and clears the rendering instruction of the foreground queue fg_que. Here, CPU 112 executes the rendering instructions in order of having stored the rendering instructions into the foreground queue fg_que. As another example, CPU 112 may combine the rendering instructions of the foreground queue fg_que together and generate and execute a new rendering instruction.

By the processing of step S911 and step S912, as to the spooled rendering instructions, it is possible to execute the backside rendering instructions collectively and after that, to execute the front-side rendering instructions collectively. By the processing of the present steps, the front-side rendering instruction is executed after the backside rendering instruction, and it is possible to generate the object image without the artifact.

In step S913, CPU 112 combines the temporary queue tmp_que to the background queue bg_que. This processing is performed by adding the rendering instruction stored in the temporary queue tmp_que to the end of the background queue bg_que.

In step S914, CPU 112 clears and empties the temporary queue tmp_que.

In step S915, CPU 112 adds the rendering instruction stored in the previous rendering instruction prev_inst to the foreground queue fg_que.

By the processing in step S908 to step S915, it is possible to store the backside rendering instruction into the background queue bg_que, and the front-side rendering instruction into the foreground queue fg_que. Then, in a case where the adjacency of the front-side rendering instructions is determined and the front-side rendering instructions are determined not to be adjacent to each other, it is possible to execute the rendering instructions by changing the execution order so as to execute the front-side rendering instructions collectively after having executed the backside rendering instructions collectively.

In step S916, CPU 112 executes and clears the rendering instruction of the background queue bg_que. Here, CPU 112 executes the rendering instructions in order of having stored the rendering instructions into the background queue bg_que.

In step S917, CPU 112 executes and clears the rendering instruction of the temporary queue tmp_que. Here, CPU 112 executes the rendering instructions in order of having stored the rendering instructions into the temporary queue tmp_que.

In step S918, CPU 112 executes and clears the rendering instruction of the foreground queue fg_que. Here, CPU 112 executes the rendering instructions in order of having stored the rendering instructions into the foreground queue fg_que. As another example, CPU 112 may combine the rendering instructions of the foreground queue fg_que together and generate and execute a new rendering instruction.

In step S919, CPU 112 executes the rendering instruction stored in the previous rendering instruction prev_inst. After having finished the present step, CPU 112 terminates the rendering processing.

By processing the graphic rendering instructions of FIG. 5 through the use of the rendering processing flow of the present example, it is possible to generate the object image without the artifact.

In the processing for the graphic rendering instruction 501, the graphic rendering instruction 501 is determined to be the next rendering instruction in step S902, and the value of the processing target rendering instruction cur_inst is set to the graphic rendering instruction 501 in step S903. Then, the previous rendering instruction prev_inst is determined to be NULL in step S904, and the flow goes to step S907. The value of the previous rendering instruction prev_inst is set to the graphic rendering instruction 501 stored in the processing target rendering instruction cur_inst in step S907. After the processing for the graphic rendering instruction 501 has been finished, the flow returns to step S902.

In processing for the image rendering instruction 502, the image rendering instruction 502 is determined to be the next rendering instruction in step S902, and the value of the processing target rendering instruction cur_inst is set to the image rendering instruction 502 in step S903. At this point, the value of the processing target rendering instruction cur_inst serves as the image rendering instruction 502, and the value of the previous rendering instruction prev_inst serves as the graphic rendering instruction 501. Then, the previous rendering instruction prev_inst is determined not to be NULL in step S904, and the flow goes to step S905. In step S905, since the rendering region of the previous rendering instruction prev_inst is included in the rendering region of the processing target rendering instruction cur_inst, the graphic rendering instruction 501 stored in the previous rendering instruction prev_inst is identified as the backside rendering instruction, and the flow goes to step S906. In step S906, the graphic rendering instruction 501 stored in the previous rendering instruction prev_inst is added to the temporary queue tmp_inst. Then, in step S907, the value of the previous rendering instruction prev_inst is set to the image rendering instruction 502 stored in the processing target rendering instruction cur_inst. After the processing for the image rendering instruction 502 has been finished, the flow returns to step S902.

In the processing for the graphic rendering instruction 503, the graphic rendering instruction 503 is determined to be the next rendering instruction in step S902, and the value of the processing target rendering instruction cur_inst is set to the graphic rendering instruction 503 in step S903. At this point, the value of the processing target rendering instruction cur_inst serves as the graphic rendering instruction 503, and the value of the previous rendering instruction prev_inst serves as the image rendering instruction 502. Then, the previous rendering instruction prev_inst is determined not to be NULL in step S904, and the flow goes to step S905. In step S905, since the rendering region of the previous rendering instruction prev_inst is not included in the rendering region of the processing target rendering instruction cur_inst, the image rendering instruction 502 stored in the previous rendering instruction prev_inst is identified as the front-side rendering instruction, and the flow goes to step S908. In step S908, the rendering rule for the previous rendering instruction prev_inst (image rendering instruction 502) is determined not to be the cross rule but to be the center rule. Then, the foreground queue fg_que is determined to be empty in step S909, and the flow goes to step S913. In step S913, the graphic rendering instruction 501 added to the temporary queue tmp_que in the processing for the image rendering instruction 502 is added to the end of the background queue bg_que. In step S914, the temporary queue tmp_que is cleared, and in step S915, the image rendering instruction 502 stored in the previous rendering instruction prev_inst is added to the foreground queue fg_que. Furthermore, in step S907, the value of the previous rendering instruction prev_inst is set to the graphic rendering instruction 503 stored in the processing target rendering instruction cur_inst. After the processing for the graphic rendering instruction 503 has been finished, the flow returns to step S902.

Next, by the processing for the image rendering instruction 504, the graphic rendering instruction 503 is added to the temporary queue tmp_que, and the value of the previous rendering instruction prev_inst serves as the image rendering instruction 504.

By the processing for the graphic rendering instruction 505, the graphic rendering instruction 503 is added to the background queue bg_que, the image rendering instruction 504 is added to the foreground queue fg_que, and the value of the previous rendering instruction prev_inst serves as the graphic rendering instruction 505.

By the processing for the image rendering instruction 506, the graphic rendering instruction 505 is added to the temporary queue tmp_que, and the value of the previous rendering instruction prev_inst serves as the image rendering instruction 506.

By the processing for the graphic rendering instruction 507, the graphic rendering instruction 505 is added to the background queue bg_que, the image rendering instruction 506 is added to the foreground queue fg_que, and the value of the previous rendering instruction prev_inst serves as the graphic rendering instruction 507.

By the processing for the image rendering instruction 508, the graphic rendering instruction 507 is added to the temporary queue tmp_que, and the value of the previous rendering instruction prev_inst serves as the image rendering instruction 508. Meanwhile, at this point, the graphic rendering instructions 501, 503, and 505 are stored in the background queue bg_que, and the image rendering instructions 502, 504, and 506 are stored in the foreground queue fg_que.

After the processing for the image rendering instruction 508 has been finished, the flow returns to step S902. In step S902, the next rendering instruction is determined not to exist, the flow goes to the processing of step S916 to step S919. In step S916, the graphic rendering instructions 501, 503, and 505 stored in the background queue bg_que are executed sequentially, and in step S917, the graphic rendering instruction 507 stored in tmp_que is executed. Then, in step S918, the image rendering instructions 502, 504, and 506 stored in the foreground queue fg_que are executed sequentially, and in step S919, the image rendering instruction 508 stored in the previous rendering instruction prev_inst is executed.

The above processing determines the condition under which the artifact caused by the division processing of the object image may be occurred. As to the rendering region where the artifact may be caused at the border part, the execution order of the rendering instructions is changed so as to cause the front-side rendering instructions to be executed collectively after the backside rendering instructions have been executed collectively. Thereby, it is possible to securely perform the rendering by using the front-side rendering instruction in the pixel in the border part of the rendering region, and to generate an image desired by a user. Furthermore, by executing the adjacent front-side rendering instructions collectively from among a series of the continuing rendering instructions, it is possible to apply the processing to the largest unit of the series of the rendering instructions in which all the front-side rendering instructions are adjacent to each other, and to improve the determination accuracy in the integrity of the rendering instruction.

Example 2

Hereinafter, processing specific to Example 2 will be explained. Meanwhile, Example 2 determines a condition under which the artifact caused by the division processing of an object image may be occurred, and generates an image desired by a user by skipping the execution of the backside rendering instruction. As far as not mentioned in particular, explanation will be omitted for the same processing as that in Example 1.

<Rendering Processing in the Image Forming Apparatus 100>

Figure 10B:
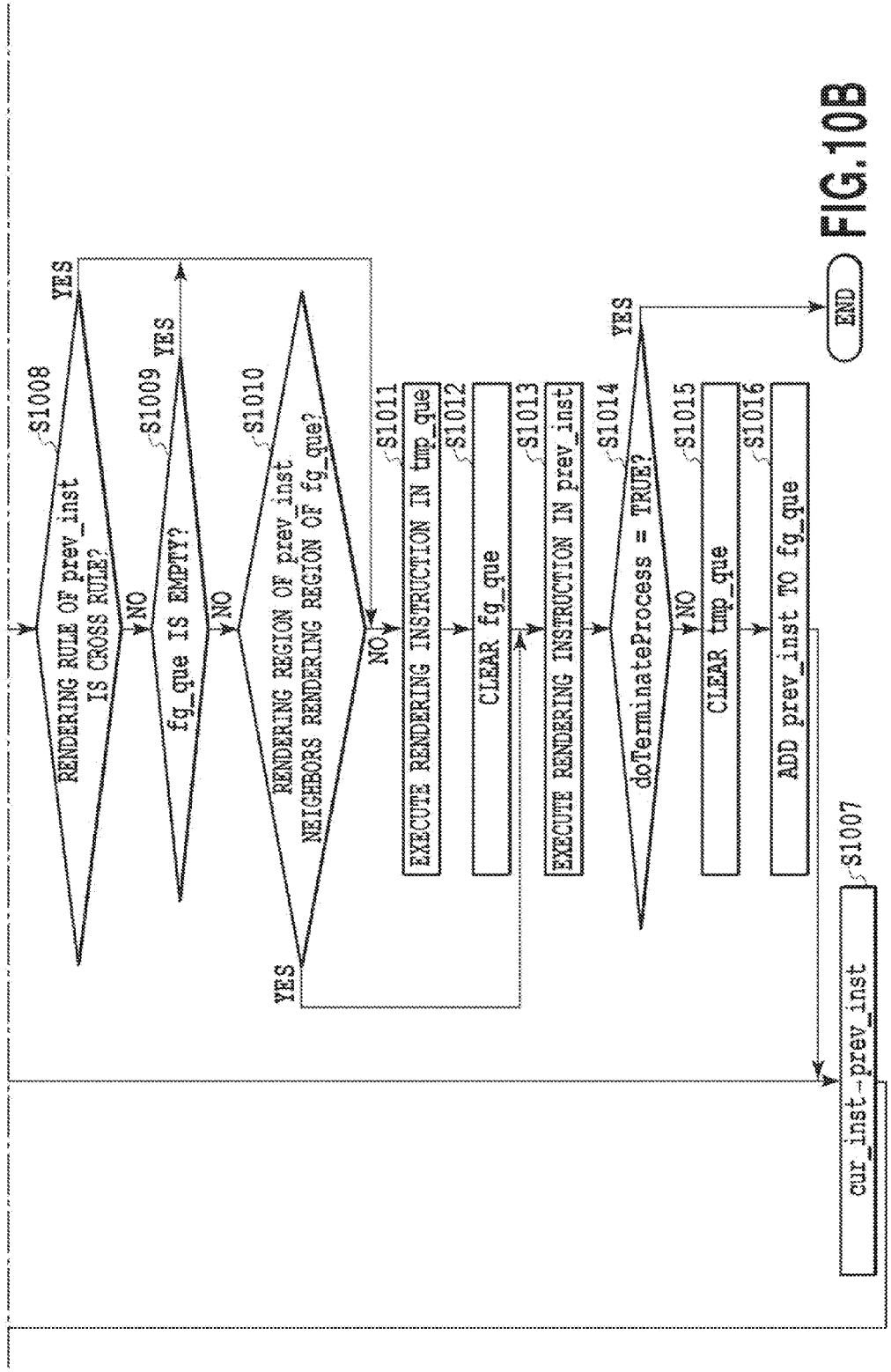

FIGS. 10A and 10B are a flowchart showing rendering processing of the image forming apparatus 100 in the present example.

In the rendering processing of FIGS. 10A and 10B, the processing target rendering instruction cur_inst, the previous rendering instruction prev_inst, and a termination flag doTerminateProcess are used as the variables. Furthermore, the temporary queue tmp_que and the foreground queue fg_que are used as the queues. The termination flag doTerminateProcess is used as a flag. The processing target rendering instruction cur_inst stores the latest rendering instruction as a current processing target, and the previous rendering instruction prev_inst stores the rendering instruction processed previously. The termination flag doTerminateProcess is a flag for managing a state whether or not the rendering processing is to be terminated, and set to be TRUE in a case where the next rendering instruction does not exist within a page. The temporary queue tmp_que is a queue spooling the rendering instruction temporarily, and is used so as to spool the rendering instruction until the latest front-side rendering instruction is found. The foreground queue fg_que is a queue spooling the front-side rendering instruction, and is used so as to spool the front-side rendering instruction as long as the front-side rendering instructions are adjacent to each other continuously.

The processing of the flowchart in FIGS. 10A and 10B is executed by CPU 112 having executed a program stored in RAM 116. The rendering processing is executed page by page.

Hereinafter, the processing of each step in the rendering processing will be explained.

In step S1001, CPU 112 initializes the variables, the queues, and the like to be used in the subsequent processing. That is, CPU 112 initializes the previous rendering instruction prev_inst to NULL, clears and empties the temporary queue tmp_que and foreground queue fg_que, and sets the termination flag doTerminateProcess to FALSE.

In step S1002, CPU 112 determines whether or not the next rendering instruction exists. In a case where the next rendering instruction is determined to exist (YES), CPU 112 reads the next rendering instruction and goes to step S1003. In a case where the next rendering instruction is determined not to exist (NO), CPU 112 goes to step S1017.

Processing of steps S1003, S1004, S1005, S1006, and S1007 is the same as the processing of steps S903, S904, S905, S906, and S907, and thus explanation is omitted.

In step S1008, CPU 112 determines whether or not the rendering rule for the previous rendering instruction prev_inst is the cross rule. Details of the present step are the same as those of step S908, and thus explanation is omitted. In a case where the rendering rule for the previous rendering instruction (Here, the front-side rendering instruction) is the cross rule, since the pixel in the border part between the front-side rendering instruction and the previous front-side rendering instruction is invariably filled by the front-side rendering instruction, the artifact is not caused. Therefore, the execution of the backside rendering instruction having the rendering region included in the front-side rendering region needs not be skipped. In the present step, in a case where the determination result shows the cross rule (YES), the flow goes to step S1011, and, in a case where the determination is made not to be the cross rule (NO), the flow goes to step S1009.

In step S1009, CPU 112 determines whether or not the foreground queue fg_que is empty. In a case where the determination is made to be empty (YES), the flow goes to step S1011. In a case where the determination is made not to be empty, the flow goes to step S1010.

In step S1010, CPU 112 determines whether or not the rendering region of the previous rendering instruction prev_inst is adjacent to the rendering region of the rendering instruction stored in the foreground queue fg_que. Details of the present step are the same as those of step S910, and thus explanation is omitted. By the processing of the present step, it is possible to determine whether or not the front-side rendering instructions identified in step S1005 are adjacent to each other. In a case where the front-side rendering instructions are not adjacent to each other, since the artifact caused by the division processing of the object image is not occurred, the execution of the backside rendering instruction included in the rendering region of the front-side rendering instruction needs not be skipped. In the present step, in a case where the determination is made to be adjacent (YES), the flow goes to step S1013, and in a case where the determination is made not to be adjacent (NO), the flow goes to step S1011. Specifically, in a case where the front-side rendering instructions is determined not to be adjacent to each other, CPU 112 executes the spooled backside rendering instruction in the processing of step S1011 (backside rendering instruction included in the rendering region of the front-side rendering instruction). Furthermore, in the processing of step S1012, the spooled adjacent front-side rendering instructions are cleared. In a case where the front-side rendering instructions is determined to be adjacent to each other, the spooled backside rendering instruction is not executed but cleared in the processing of step S1013 and the subsequent steps.

In step S1011, CPU 112 executes the rendering instruction in the temporary queue tmp_que. Here, CPU 112 executes the rendering instructions in order of having stored the rendering instructions into the temporary queue tmp_que.

In step S1012, CPU 112 clears the rendering instruction in the foreground queue fg_que and empties the foreground queue fg_que.

In step S1013, CPU 112 executes the rendering instruction stored in the previous rendering instruction prev_inst.

In step S1014, CPU 112 determines whether or not the termination flag doTerminateProcess is TRUE. In a case where the determination result shows TRUE (YES), the rendering processing is terminated. In a case where the determination is made to be FALSE (NO), the flow goes to step S1015.

In step S1015, CPU 112 clears the rendering instruction in the temporary queue tmp_que and empties the temporary queue tmp_que.

In step S1016, CPU 112 adds the rendering instruction stored in the previous rendering instruction prev_inst to the foreground queue fg_que.

By the processing of step S1008 to step S1016, the backside rendering instruction can be stored into the temporary queue tmp_que without being executed immediately. Then, the adjacency of the front-side rendering instructions is determined, and in a case where the front-side rendering instructions are adjacent to each other, it is determined that the artifact caused by the division processing of the object image may be occurred, and the backside rendering instruction stored in the temporary queue tmp_que can be cleared without being executed. In a case where the front-side rendering instructions are not adjacent to each other, the artifact caused by the division processing of the object image is not occurred, and thus it is possible to execute the backside rendering instruction stored in the temporary queue tmp_que as usual.

In a case where the next rendering instruction is determined not to exist in step S1002, the flow goes to step S1017. In step S1017, CPU 112 sets the termination flag doTerminateProcess to TRUE. After the processing in the present step has been finished, the flow goes to step S1008. Then, after having executed the processing of step S1008 to step S1013, CPU 112 determines that the termination flag doTerminateProcess is TRUE in S1014, and terminates the rendering processing.

By processing the graphic rendering instructions of FIG. 5 through the use of the rendering processing flow of the present example, it is possible to generate the object image without the artifact.

In the processing for the graphic rendering instruction 501, the value of the previous instruction prev_inst is set to the graphic rendering instruction 501 in step S1007.

In the processing for the image rendering instruction 502, the backside rendering instruction identified in step S1005 (graphic rendering instruction 501) is stored into the temporary queue tmp_que. Furthermore, in step S1007, the value of the previous rendering instruction prev_inst is set to the image rendering instruction 502.

In the processing for the graphic rendering instruction 503, the image rendering instruction 502 is identified as the font-side rendering instruction in step S1005 and the flow goes to the determination processing of step S1008 to step S1010. Since the foreground queue fg_que is empty, the flow goes to step S1011. In step S1011, the backside rendering instruction stored in the temporary queue tmp_que (graphic rendering instruction 501) is executed as usual. Then, in step S1013, the front-side rendering instruction stored in the previous rendering instruction prev_inst (image rendering instruction 502) is executed. Furthermore, in step S1015, the temporary queue tmp_que storing the executed backside rendering instruction (graphic rendering instruction 501) is cleared. In step S1016, the image rendering instruction 502 is added to the foreground queue fg_que, and the foreground queue fg_que is used for determining the adjacency of the front-side rendering instructions.

The processing for the image rendering instruction 504 is similar to the processing for the image rendering instruction 502. In the processing for the image rendering instruction 504, the backside rendering instruction identified in step S1005 (graphic rendering instruction 503) is stored into the temporary queue tmp_que. In addition, the value of the previous rendering instruction prev_inst is set to the image rendering instruction 504 in step S1007.

In the processing for the graphic rendering instruction 505, the image rendering instruction 504 is identified as the front-side rendering instruction in step S1005, and the flow goes to the determination processing of step S1008 to step S1010. The front-side rendering instructions are determined to be adjacent to each other, the execution of the backside rendering instruction stored in the temporary queue tmp_que (graphic rendering instruction 505) is skipped, and the flow goes to the processing of step S1013 and the subsequent steps. In step S1013, the front-side rendering instruction stored in the previous rendering instruction prev_inst (image rendering instruction 504) is executed. In step S1015, the temporary queue tmp_que storing the backside rendering instruction is cleared. In step S1016, the image rendering instruction 504 is added to the foreground queue fg_que.

The processing for the image rendering instruction 506 is similar to the processing of image rendering instructions 502 and 504. In the processing for the image rendering instruction 506, the backside rendering instruction identified in step S1005 (graphic rendering instruction 505) is stored into the temporary queue tmp_que. In addition, in step S1007, the value of the previous rendering instruction prev_inst is set to the image rendering instruction 506.

The processing for the graphic rendering instruction 507 is similar to the processing for the graphic rendering instruction 505. In the processing for the graphic rendering instruction 507, the execution of the backside rendering instruction stored in the temporary queue tmp_que (graphic rendering instruction 505) is skipped. Furthermore, the front-side rendering instruction stored in the previous rendering instruction prev_inst (image rendering instruction 506) is executed, the temporary queue tmp_que storing the backside rendering instruction is cleared, and the image rendering instruction 506 is added to the foreground queue fg_que.

Processing for the image rendering instruction 508 is similar to the processing for the image rendering instructions 502,

504, and 506. In the processing for the image rendering instruction 508, the backside rendering instruction identified in step S1005 (graphic rendering instruction 507) is stored into the temporary queue tmp_que. Furthermore, in step S1007, the value of the previous rendering instruction prev_inst is set to the image rendering instruction 508.

After the processing for the image rendering instruction 508 has been finished, the flow returns to step S1002. Then, it is determined in step S1002 that the next rendering instruction does not exist, and the flow goes to step S1017. In step S1017, the termination flag doTerminateProcess is set to TRUE, and the flow goes to the processing of step S1008 and the subsequent steps. In step S1013, the front-side rendering instruction stored in the previous rendering instruction prev_inst (image rendering instruction 508) is executed. Then, in step S1014, the termination flag doTerminateProcess is determined to be TRUE, and the rendering processing is terminated.

By the above processing, the condition under which the artifact caused by the division processing of the object image may be occurred is determined, and for the rendering region where the artifact may be caused in the border part, the execution of the backside rendering instruction is skipped. Thereby, it is possible to securely perform rendering by using the front-side rendering instruction in the pixel in the border part of the rendering region, and to generate an image desired by a user.

Example 3

Hereinafter, processing specific to Example 3 will be explained. Meanwhile, Example 3 determines a condition under which the artifact caused by the division processing of an object image may be occurred, and generates an image desired by a user by interpolating a pixel in which the artifact may have been caused, with the color of the front-side rendering instruction. Unless mentioned in particular, explanation is omitted for the same processing as that of Examples 1 and 2.

<Rendering Processing in the Image Forming Apparatus 100>

FIGS. 11A and 11B are a flowchart showing rendering processing of the image forming apparatus 100 in the present example.

In the rendering processing of FIGS. 11A and 11B, the processing target rendering instruction cur_inst, the previous rendering instruction prev_inst, a rendered foreground outline fg_borders, and the termination flag doTerminateProcess are used as the variables. The processing target rendering instruction cur_inst, the previous rendering instruction prev_inst, and the termination flag doTerminateProcess are the same as those in Example 2, and thus explanation is omitted. The rendered foreground outline fg_borders is a buffer for storing the coordinates of the outline in the front-side rendering instruction, and is used for storing the rendering region of the front-side rendering instruction while the front-side rendering instructions are adjacent to each other continuously.

The processing of the flowchart in FIGS. 10A and 10B is executed by CPU 112 having executed a program stored in RAM 116. The rendering processing is executed page by page.

Hereinafter, the processing in each step of the rendering processing will be explained.

In step S1101, CPU 112 initializes the variables and the like used in the subsequent processing. That is, the previous rendering instruction prev_inst is initialized to NULL, the rendered foreground outline fg_borders are cleared to be empty, and the termination flag doTerminateProcess is set to FALSE.

In step S1102, CPU 112 determines whether or not the next rendering instruction exists. In a case where the next rendering instruction is determined to exist (YES), CPU 112 reads the next rendering instruction and goes to step S1103. In a case where the next rendering instruction is determined not to exist (NO), CPU 112 goes to step S1115.

The processing of steps 1103 and S1104 is the same as the processing of steps S903 and S904, and thus explanation is omitted.

In step S1105, CPU 112 executes the rendering instruction stored in the previous rendering instruction prev_inst.

In step S1106, CPU 112 determines whether or not the rendering region of the previous rendering instruction prev_inst is included in the rendering region of the processing target rendering instruction cur_inst. Details of the processing in the present step are the same as those of the steps S905 and S1005, and thus explanation is omitted. In a case where the determination is made to be included (YES), the rendering instruction stored in the previous rendering instruction prev_inst can be identified as the backside rendering instruction, and the flow goes to step S1107. In a case where the determination is made not to be included (NO), the rendering instruction stored in the previous rendering instruction prev_inst can be identified as the front-side rendering instruction, and the flow goes to step S1108.

The processing of step S1107 is the same as the processing of step S907, and thus explanation is omitted.

In step S1108, CPU 112 determines whether or not the rendering rule for the previous rendering instruction prev_inst is the cross rule. Details of the present step are the same as those of step S908, and thus explanation is omitted. In a case where the rendering rule for the front-side rendering instruction is the cross rule, since the pixel in the border part between the front-side rendering instruction and the previous front-side rendering instruction is invariably filled by the front-side rendering instruction, the artifact is not occurred. Therefore, interpolation processing needs not be performed in step S1111 to be described below. In the present step, in a case where the determination is made to be the cross rule (YES), the flow goes to step S1112, and in a case where the determination is made not to be the cross rule (NO), the flow goes to step S1109.

In step S1109, CPU 112 determines whether or not the rendered foreground outline fg_borders is empty. In a case where the determination is made to be empty (YES), the flow goes to step S1113. In a case where the determination is made not to be empty (NO), the flow goes to step S1110.

In step S1110, CPU 112 determines whether or not a part of the outline in the rendering region of the previous rendering instruction prev_inst coincides with a part of the outline in the rendered foreground outline fg_borders. In a case where the determination is made to be coincident in the processing of the present step, the rendering region of the previous rendering instruction prev_inst can be considered to be adjacent to the rendering region of the front-side rendering instruction rendered in the past. By the processing of the present step, it is possible to determine whether or not the front-side rendering instructions identified in step S1106 are adjacent to each other. In a case where the front-side rendering instructions are not adjacent to each other, since the artifact caused by the division processing of the object image is not occurred, interpolation processing needs not be performed in step S1111 to be described below. In the present step, in a case where the determination is made to be coincident (YES), the flow goes to step S1111, and, in a case where the determination is made not to be coincident (NO), the flow goes to step S1112. Specifically, in a case where the front-side rendering instructions are determined to be adjacent to each other, CPU 112 performs processing (interpolation processing) filling the adjacent pixels on the border, with the outline color at the corresponding coordinates in the previous rendering instruction prev_inst, in step S1111. In a case where the front-side rendering instructions are determined not to be adjacent to each other, CPU 112 does not executes the interpolation processing, and performs processing of clearing the rendered foreground outline fg_borders which is a buffer storing the outline coordinates of the front-side rendering instruction, in step S1112.

In step S1111, CPU 112 fills the coincident pixel on the rendered foreground outline fg_borders with the outline color at the corresponding coordinates in the previous rendering instruction prev_inst. This processing can be considered to be processing of filling the adjacent pixels on the border by changing the rendering rule for the previous rendering instruction prev_inst. By the processing of the present step, it is possible to interpolate the pixel in which the artifact may have been caused with the color of the front-side rendering instruction and to generate the object image without the artifact. After the processing of the present step has been finished, the flow goes to step S1113.

In step S1112, CPU 112 clears and empties the rendered foreground outline fg_borders. After the processing of the present step has been finished, the flow goes to step S1113.

In step S1113, CPU 112 determines whether or not the termination flag doTerminateProcess is TRUE. In a case where the determination is made to be TRUE (YES), the rendering processing is terminated. In a case where the determination is made to be FALSE (NO), the flow goes to step S1114.

In step S1114, CPU 112 adds the outline coordinates in the previous rendering instruction prev_inst to the rendered foreground outline fg_borders. Here, the information added to the rendered foreground outline fg_borders may be the coordinates of the pixel on the outline or the coordinates at the end point of the outline. Furthermore, as in Examples 1 and 2, the front-side rendering instruction may be stored and the adjacency may be determined from the outline of the rendering region thereof in the processing of step S1110.

By the processing of step S1108 to step S1114, it is possible to determine the adjacency of the front-side rendering instructions, and in a case where the front-side rendering instructions are adjacent to each other, it is possible to fill the pixel in which the artifact may have been occurred, with the front-side rendering instruction.

In a case where the next rendering instruction is determined not to exist in step S1002, the flow goes to the processing of step S1115. In step S1115, CPU 112 sets the termination flag doTerminateProcess to TRUE, and the flow goes to step S1116.

In step S1116, CPU 112 executes the rendering instruction stored in previous rendering instruction prev_inst. After the processing of the present step has been finished, the flow goes to the processing of step S1108 and the subsequent steps. In step S1113, the termination flag doTerminateProcess is determined to be TRUE, and the rendering processing is terminated.

By processing the graphic rendering instructions of FIG. 5 by using the rendering processing flow of the present example, it is possible to generate the object image without the artifact.

In the processing for the graphic rendering instruction 501, in step S1107, the value of the previous rendering instruction prev_inst is set to the graphic rendering instruction 501.

In the processing for the image rendering instruction 502, first, the rendering instruction stored in the previous rendering instruction prev_inst (graphic rendering instruction 501) is executed. Then, in step S1106, the rendering instruction (graphic rendering instruction 501) is identified as the backside rendering instruction, and the flow goes to step S1107. In step S1107, the value of the previous rendering instruction prev_inst is set to the image rendering instruction 502.

In the processing for the graphic rendering instruction 503, first, the rendering instruction stored in the previous rendering instruction prev_inst (image rendering instruction 502) is executed. Then, in step S1106, the rendering instruction (image rendering instruction 502) is identified as the front-side rendering instruction, and the flow goes to the processing of steps S1108, S1109, and S1110. Since the rendered foreground outline fg_borders is empty, the interpolation processing is not performed and the flow goes to the processing of step S1113 and the subsequent steps. In step S1114, the outline coordinates of the front-side rendering instruction (image rendering instruction 502) are added to the rendered foreground outline fg_borders. In step S1107, the value of the previous rendering instruction prev_inst is set to the graphic rendering instruction 503.

The processing for the image rendering instruction 504 is similar to the processing for the image rendering instruction 502. In the processing of the image rendering instruction 504, first, the rendering instruction stored in the previous rendering instruction prev_inst (graphic rendering instruction 503) is executed. Then, in step S1106, the rendering instruction (graphic rendering instruction 503) is identified as the backside rendering instruction, and the flow goes to step S1107. In step S1107, the value of the previous rendering instruction prev_inst is set to the image rendering instruction 504.

In the processing for the graphic rendering instruction 505, first, the rendering instruction stored in the previous rendering instruction prev_inst (image rendering instruction 504) is executed. Then, in step S1106, the rendering instruction (image rendering instruction 504) is identified as the front-side rendering instruction, and the flow goes to the determination processing of steps S1108, S1109, and S1110. Since a part of the outline in the image rendering instruction 504 coincides with a part of the outline in the image rendering instruction 502 stored in the rendered foreground outline fg_borders, the front-side rendering instructions are determined to be adjacent to each other, and the flow goes to step S1111. In step S1111, CPU 112 performs the processing (interpolation processing) of filling the adjacent pixels on the border with the outline color at the corresponding coordinates of the front-side rendering instruction (image rendering instruction 504). Then, in step S1114, the outline coordinates of the front-side rendering instruction (image rendering instruction 504) are added to the rendered foreground outline fg_borders. In step S1107, the value of the previous rendering instruction prev_inst is set to the graphic rendering instruction 505.

The processing for the image rendering instruction 506 is similar to the processing for the image rendering instructions 502 and 504. In the processing for the image rendering instruction 506, first, the rendering instruction stored in the previous rendering instruction prev_inst (graphic rendering instruction 505) is executed. Then, in step S1106, the rendering instruction (graphic rendering instruction 505) is identified as the backside rendering instruction, and the flow goes to step S1107. In step S1107, the value of the previous rendering instruction prev_inst is set to the image rendering instruction 506.

The processing for the graphic rendering instruction 507 is similar to the processing for the graphic rendering instruction 505. In the processing for the graphic rendering instruction 507, first the rendering instruction stored in the previous rendering instruction prev_inst (image rendering instruction 506) is executed. In step S1111, CPU 112 performs the processing (interpolation processing) of filling the adjacent pixels on the border with the outline color at the corresponding coordinates of the front-side rendering instruction (image rendering instruction 506). In step S1114, the outline coordinates of the front-side rendering instruction (image rendering instruction 506) are added to the rendered foreground outline fg_borders. In step S1107, the value of the previous rendering instruction prev_inst is set to the graphic rendering instruction 507.

The processing for the image rendering instruction 508 is similar to the processing for the image rendering instruction of image rendering instructions 502, 504, and 506. In the processing for the image rendering instruction 508, first, the rendering instruction stored in the previous rendering instruction prev_inst (graphic rendering instruction 507) is executed. Then, in step S1106, the rendering instruction (graphic rendering instruction 507) is identified as the back-side rendering instruction, and the flow goes to step S1107. In step S1107, the value of the previous rendering instruction prev_inst is set to the image rendering instruction 508.

After the processing for the image rendering instruction 508 has been finished, the flow returns to step S1102. Then, in step S1102, it is determined that the next rendering instruction does not exist, and the flow goes to step S1115. In step S1115, the termination flag doTerminateProcess is set to TRUE, and the flow goes to step S1116. In step S1116, the rendering instruction stored in the previous rendering instruction prev_inst (image rendering instruction 508) is executed, and the flow goes to the processing of step S1108 and the subsequent steps. In step S1111, CPU 112 executes the processing (interpolation processing) of filling the adjacent pixels on the border with the outline color at the corresponding coordinates of the front-side rendering instruction (image rendering instruction 508). Then, in step S1113, the termination flag doTerminateProcess is determined to be TRUE, the rendering processing is terminated.

By the above processing, the condition under which the artifact caused by the division processing of the object image may be occurred is determined, and the pixel in which the artifact may have been caused is interpolated with the color of the front-side rendering instruction. Thereby, it is possible to securely render the pixel in the border part of the rendering region by using the front-side rendering instruction and to generate an image desired by a user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-108873, filed May 23, 2013, which is hereby incorporated by reference herein in its entirety.

What is claimed is:

1. An image processing apparatus, comprising:
an obtaining unit configured to obtain a foreground image object to be rendered with an overlap with a background image object, the foreground image object partially overlapping a pixel which is partially overlapped by the background image object;
a determination unit configured to determine whether or not at least information indicating a rendering rule for the foreground image object indicates a specific rendering rule among a plurality of rendering rules, the rendering rule for an object being indicated by a kind of attribute of the object; and
a control unit configured to control a rendering so that the obtained foreground image object shows up and the obtained background image object does not show up in the pixel, in a case where the determination unit determines that at least the information does not indicate the specific rendering rule.

2. The imaging processing apparatus according to claim 1, wherein
the foreground image object does not overlap a center of the pixel, and
an outline of the foreground image object is positioned closer to the center of the pixel than an outline of the background image object.

3. The imaging processing apparatus according to claim 2, wherein
a region of the foreground image object includes a region of the background image object.

4. The imaging processing apparatus according to claim 3, wherein
the foreground image object is one of a plurality of image objects which is divided from an original foreground image object.

5. The imaging processing apparatus according to claim 4, wherein
the foreground image object is adjacent to another image object among the plurality of image objects, on the pixel,
the obtaining unit obtains the another image object, and
the obtained image objects are rendered in order of the another image object, the background image object, and the foreground image object.

6. The image processing apparatus according to claim 5, wherein
the control unit performs control so that the rendering of both of the another image object and the foreground image object is performed after the rendering of the background image object, in a case where the determination unit determines that at least the information does not indicate the specific rendering rule.

7. The image processing apparatus according to claim 6, wherein the control unit:
includes a spooler configured to spool the another image object, the background image object, and the foreground image object, and
performs the control by obtaining the another image object and the foreground image object from the spooler and rendering the another image object and the foreground image object, after having obtained the background image object from the spooler and rendered the background image object, in a case where the determination unit determines that at least the information does not indicate the specific rendering rule.

8. The image processing apparatus according to claim 5, wherein
the control unit performs control so that the background image object is removed from a rendering target, in a case where the determination unit determines that the information does not indicate the specific rendering rule.

9. The image processing apparatus according to claim 8, wherein the control unit:
includes a spooler configured to spool the another image object and the foreground image object without spooling the background image object, in a case where the determination unit determines the information does not indicate the specific rendering rule, and
performs the control by obtaining the another image object and the foreground image object from the spooler and rendering the another image object and the foreground image object, in a case where the determination unit determines that the information does not indicate the specific rendering rule.

10. The image processing apparatus according to claim 5, wherein
the control unit performs control so that in the pixel, an outline color of the foreground image object is rendered, in a case where the determination unit determines that the information does not indicate the specific rendering rule.

11. The image processing apparatus according to claim 1, wherein
the rendering rule for the foreground image object and the rendering rule for the background image object are different from each other.

12. The image processing apparatus according to claim 11, wherein
the specific rendering rule is a cross rule.

13. The image processing apparatus according to claim 12, wherein
the rendering rule for the foreground image object is a center rule.

14. The image processing apparatus according to claim 13, wherein
an attribute of the foreground image object is an image attribute, and
an attribute of the background image object is a graphic attribute.

15. An image processing method, comprising:
obtaining a foreground image object to be rendered with an overlap with a background image object, the foreground image object partially overlapping a pixel which is partially overlapped by the background image object;
determining whether or not at least information indicating a rendering rule for the foreground image object indicates a specific rendering rule among a plurality of rendering rules, the rendering rule for an object being indicated by a kind of attribute of the object; and
controlling a rendering so that the obtained foreground image object shows up and the obtained background image object does not show up in the pixel, in a case where it is determined that the information does not indicate the specific rendering rule.

16. An image processing apparatus comprising:
an obtaining unit configured to obtain one or more objects, wherein the obtaining unit obtains two foreground image objects which adjoin each other and overlap a common pixel partially;
a checking unit configured to check first information indicating a rendering rule for one of the obtained two foreground image objects and second information indicating a rendering rule for another one of the obtained two foreground image objects, the rendering rule for an object being indicated by a kind of attribute of the object; and
a control unit configured to control, on a basis of a check result, a rendering of the obtained two foreground image objects so that in the common pixel, either one of the obtained two foreground image objects shows up instead of a background image object of either one of the obtained two foreground image objects.

17. The image processing apparatus according to claim 16, wherein the checking unit checks if the first information indicates a specific rendering rule among a plurality of rendering rules and the second information indicates the specific rendering rule among the plurality of the rendering rules.

18. The image processing apparatus according to claim 17, wherein the specific rendering rule is a cross rule.

19. The image processing apparatus according to claim 17, wherein the specific rendering rule is a cross rule, and
wherein the control unit performs the control of rendering if the check result indicates that the first information does not indicate the cross rule and the second information does not indicate the cross rule.

20. The image processing apparatus according to claim 19, wherein the controlled rendering includes sorting a rendering order of the obtained two foreground image objects.

21. The image processing apparatus according to claim 20, wherein, as a result of the sort, one of the obtained two foreground image objects and another one of the obtained two foreground image objects are rendered sequentially.

22. The image processing apparatus according to claim 21, wherein, as the result of the sort, one of the obtained two foreground image objects and another one of the obtained two foreground image objects are rendered sequentially after the background image object is rendered.

23. The image processing apparatus according to claim 19, wherein the controlled rendering includes cancelling a rendering of the background image object.

24. The image processing apparatus according to claim 19, wherein the controlled rendering includes executing a rendering of the obtained two foreground image objects and further filling the common pixel with either one of the obtained two foreground image objects.

25. The image processing apparatus according to claim 24, wherein the filling is executed after a rendering of the background image object.

* * * * *